United States Patent [19]

Herbst et al.

[11] 4,024,500
[45] May 17, 1977

[54] SEGMENTATION MECHANISM FOR CURSIVE SCRIPT CHARACTER RECOGNITION SYSTEMS

[75] Inventors: Noel Martin Herbst, Mount Kisco; John Henry Morrissey, Chappaqua, both of N.Y.

[73] Assignee: International Business Machines Corporation, Armonk, N.Y.

[22] Filed: Dec. 31, 1975

[21] Appl. No.: 645,841

[52] U.S. Cl. .................................. 340/146.3 SG
[51] Int. Cl.² ..................................... G06K 9/00
[58] Field of Search .......... 340/146.3 SG, 146.3 SY

[56] References Cited
UNITED STATES PATENTS

| | | | |
|---|---|---|---|
| 3,111,646 | 11/1963 | Harmon | 340/146.3 SG |
| 3,344,399 | 9/1967 | Bonner | 340/146.3 SG |

*Primary Examiner*—Joseph M. Thesz
*Attorney, Agent, or Firm*—Roy R. Schlemmer, Jr.

[57] ABSTRACT

A method and apparatus for effecting character segmentation in a cursive script handwriting analysis system which comprises obtaining the continuous $x$ and $y$ coordinates and the $x$ and $y$ velocities of a writing instrument forming said cursive character. Continuously averaging the $x$ displacement associated with all the $x$ and $y$ extremal points of a handwritten character where the $x$ or the $y$ velocity equals zero. Successively examining the $x$ displacement for each $x$-extremal and determining if the $x$ displacement of said extremal exceeds a predetermined threshold value relative to the average $x$ displacement of the current character and if so indicating that said new extremal is located in the next character and that a segmentation mark should be placed at a predetermined distance along the ligature between the just analyzed extremal and the previously analyzed extremal. The results of this segmentation are then communicated to a character recognition mechanism whose efficiency and accuracy is greatly enhanced by said segmentation indication. The system as designed is also able to follow deviations from the baseline and mid-zone line as the writing progresses.

18 Claims, 19 Drawing Figures

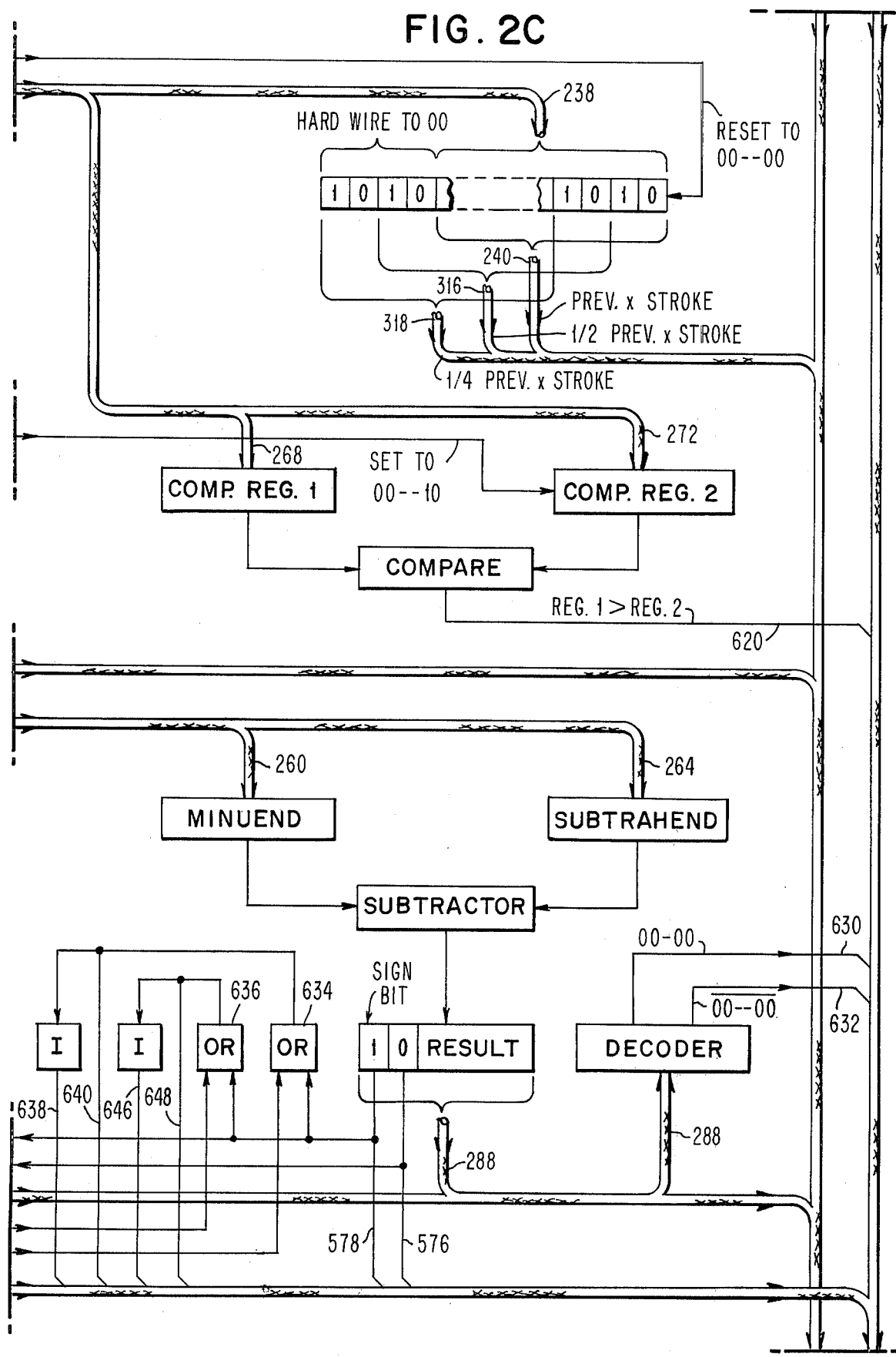

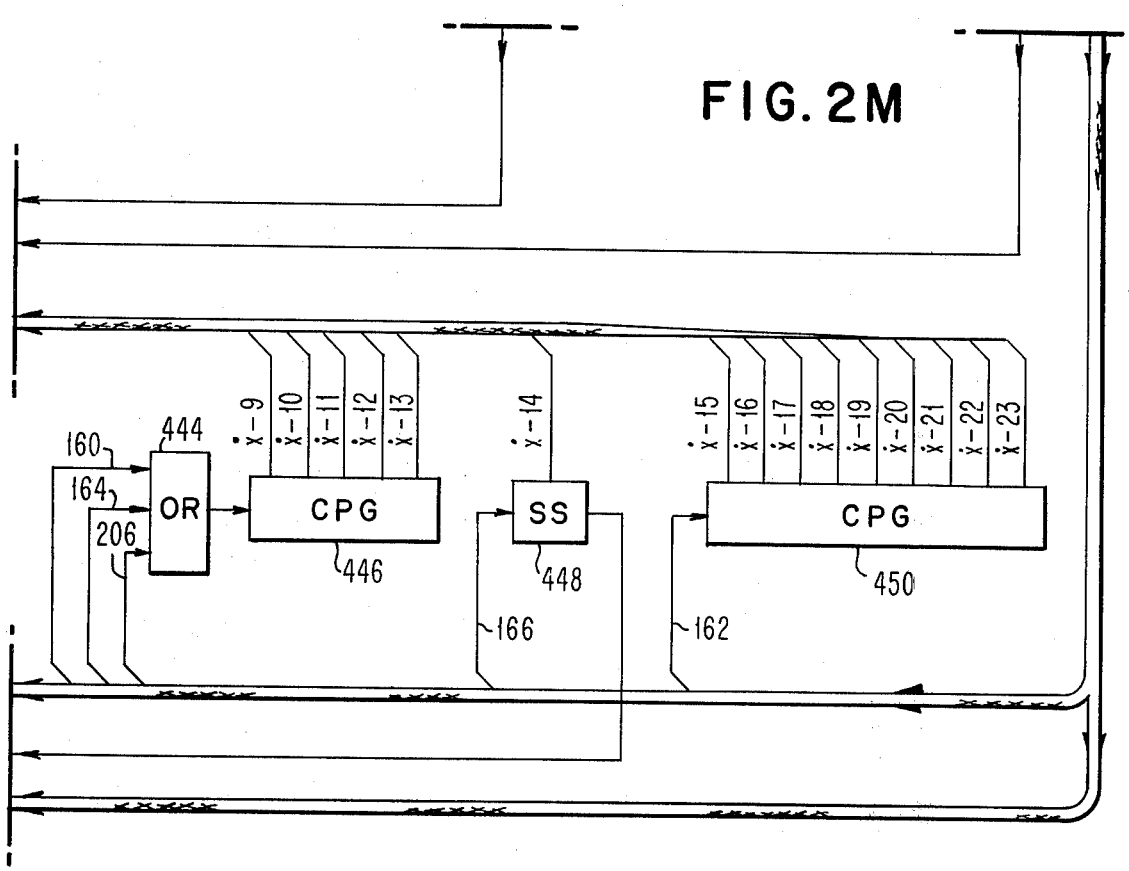

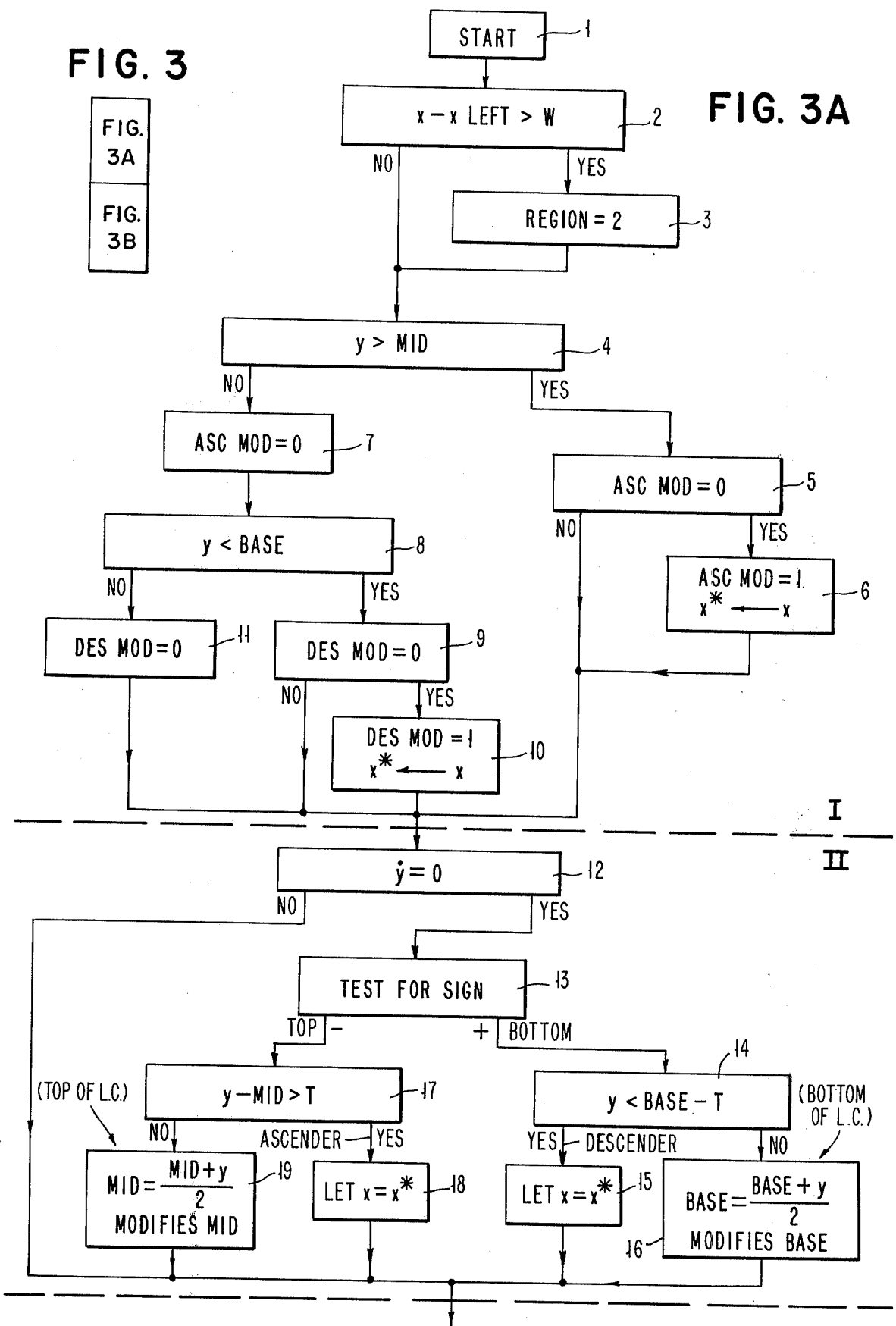

SEGMENTATION MECHANISM FOR CURSIVE SCRIPT CHARACTER RECOGNITION SYSTEMS

BACKGROUND OF THE INVENTION

The present invention relates generally to the field of character recognition and more specifically to mechanisms for recognizing cursive writing. It is important to distinguish ordinary cursive writing to which the present invention relates from the more restrictive forms of hand printing which represent the current state of the art of automatic character recognition. In this later instance there are a number of products on the market including the IBM 1287 Optical Scanner, as well as the RAND and SDC tablet programs, which recognize individual hand printed symbols which must be separate and disconnected from each other. In addition these symbols usually must be constrained insofar as shape and size is concerned.

A major problem faced in the analysis of cursive script is the segmentation of the words automatically into characters suitable for a recognition mechanism based on characters to operate upon. Although there have been attempts to perform "whole word recognition," such systems have not worked at all well and are of theoretical interest only.

Although such systems are workable they have a rather severely limited utility as they are not able to process what would be classified as normal cursive writing written at a person's normal writing speed.

U.S. Pat. No. 3,111,646 dated Nov. 19, 1963 of L.D. Harmon discloses a method and apparatus for reading cursive script. In this patent the inventor discloses a system for achieving the analysis of cursive script writing. The system disclosed in this patent has a number of defects, foremost being the fact that the segmentation algorithm being unduly restrictive, requires the writing to be well-proportioned. Harmon determines various zones by taking the overall height of an entire line, from the bases of the descenders to the peaks of the ascenders, and divides the height into four parts for use in the recognition system. This requires that the input be very well-proportioned and that the writing not slope or deviate from the baseline. It has been found in practice that the heights of ascenders and descenders are a matter of personal sytle and are highly variable. The absolute of an ascender or descender is not of great importance to humans. What is important is the fact that such an event has taken place.

The above referenced Harmon patent contains a segmentation algorithm that is entirely retrospective. That is, an entire line of script is taken into storage registers, and the segmentation points are determined by first determining the average letter width, based principally on the number of zero axis crossings. This has a number of drawbacks in addition to those specifically mentioned in the patent. First, it requires that the input be very well-proportioned, i.e., that the writer maintain substantially the same letter width throughout. Secondly, it is not sequential. For a practical system, it is desirable for segmentation and recognition to be done in "real time". That is the system should display its results as soon as possible after the character is formed.

This system is intended to replace conventional dictation. It should given transcription of "rough draft" quality.

As is well known one of the more common forms of representing alphanumeric data is cursive script. In order to achieve machine recognition of the connected characters which form cursive script words it is necessary that the words be segmented into their individual letter components. Segmentation in itself is an extremely difficult problem in the case of connected written script, in view of the extraordinary numbers of variations handwritten material may take. The form of the ligature depends on the two characters being joined, the overall context, and such general factors as fatigue and the physical conditions under which the writing is done, i.e., sitting, standing, etc.

As stated previously U.S. Pat. No. 3,111,646 of Harmon attacks the segmentation problem in a rather imprecise manner, and at best can only approximate segmentation. Thus as a writer's letter width varies greatly or for some reason certain letters do not have zero crossings the segmentation will in all probablity be wrong. It is apparent from the previous discussion that some more precise method for automatically segmenting the individual characters in cursive script handwriting must be provided for such systems to be at all practical.

SUMMARY AND OBJECTS OF THE INVENTION

It has been found that greatly enhanced character recognition may be achieved by utilizing a segmentation approach based primarily on writing dynamics. More particularly the segmentation decision is based on those features which are defined by the points at which the stylus velocity in the X or Y axis is zero. Utilizing this general approach much greater accuracy is possible when making an automatic segmentation decision. An additional feature is the setting up of three very precise zones in which the characters are analyzed whereby stroke data in predetermined zones is weighted in a unique fashion to provide enhanced segmentation results.

It is accordingly a primary object of the present invention to provide a practical means for segmenting continuous script into individual characters for the ultimate purpose of character recognition.

It is a further object of the invention to provide a segmentation scheme which includes a method for developing a more reliable indication of the critical zones of the characters which indication materially aids the segmentation mechanism, even though the writing departs substantially from a level base line.

It is a still further object of the invention to provide such a segmentation scheme which generates effectively even though the characters are severly slanted or have otherwise significant overlapping areas.

It is yet another object of the invention to provide such a segmentation method relying principally on signature dynamics to define strokes and thus materially aid in the segmentation process.

It is another object of the invention to provide such a segmentation scheme which allows the associated character recognition and display circuitry to in effect operate on a real time basis. Thus, as each character is segmented it may be immediately sent to the associated character recognition circuitry and a conventional alpha-numeric computer-like display used to display the "recognized" alpha-numeric character on a viewing screen. In this way the writer is able to continuously monitor what he is writing. This in itself allows for a considerable saving in hardware and storage circuitry which would otherwise have to store and process a complete line of cursive characters at a time with a system such as suggested in the previously referenced Harmon patent.

Other objects, features and advantages of the invention will become apparent from the following description of the disclosed preferred embodiment of the invention.

DESCRIPTION OF THE DRAWINGS

FIG. 2 is an organizational chart for FIGS. 2A through 2M.

FIGS. 2A through 2M comprise a logical schematic diagram of a preferred embodiment of a segmentation mechanism for cursive script handwriting constructed in accordance with the teachings of the present invention.

FIG. 3 is an organizational chart for FIGS. 3A and 3B.

FIGS. 3A and 3B represent a flowchart of the segmentation mechanism of the present invention.

DETAILED DESCRIPTION OF THE PREFERRED EMBODIMENT

The underlying concept on which the operation of the herein disclosed method and apparatus for performing segmentation on cursive script writing is based on a recognition of the fact that certain writing dynamics may be utilized very benefically to perform the segmentation operation. Sequentially obtained x-y displacement data is obtained from a conventional x-y stylus input tablet many of which are available on the market. The Tablet controls provide x-y displacement data, in digitized form, indicating the instantaneous location of a writing stylus on the surface of said tablet as cursive script is being formed. In addition to the displacement information, means are provided for obtaining the first derivative of the stylus displacement in both the x and y direction. Throughout the remainder of the specification this first derivative or velocity is denoted by the symbol $\dot{x}$ and $\dot{y}$ respectively for the velocity magnitude in the x and y direction respectively. As will be understood, any time the stylus physically stops momentarily or changes direction either or both the x and y velocities become zero. ($\dot{x}$ equals zero and/or $\dot{y}$ equals zero). In the following description of the invention these points are referred to as extremals. It is in the use of these extremals in a particular way, that the advantages of the present invention are obtained. As will be apparent from the subsequent description it has been found that all of the extremals for a particular character with the exception of those associated with ascenders and descenders, will tend to lie close to the actual center of said character. This statistical observation or average may be greatly enhanced by a further feature of the present invention which identifies ascender and descender strokes which go above the top of normal lower case letters and below the base line of normal lower case letters respectively. The x displacement value for the extremal associated with the ascender and descender strokes are in effect taken at the point where they cross mid-zone or base line respectively. The present system includes means for recognizing ascender and descender strokes and for treating them accordingly.

Figure 1A:
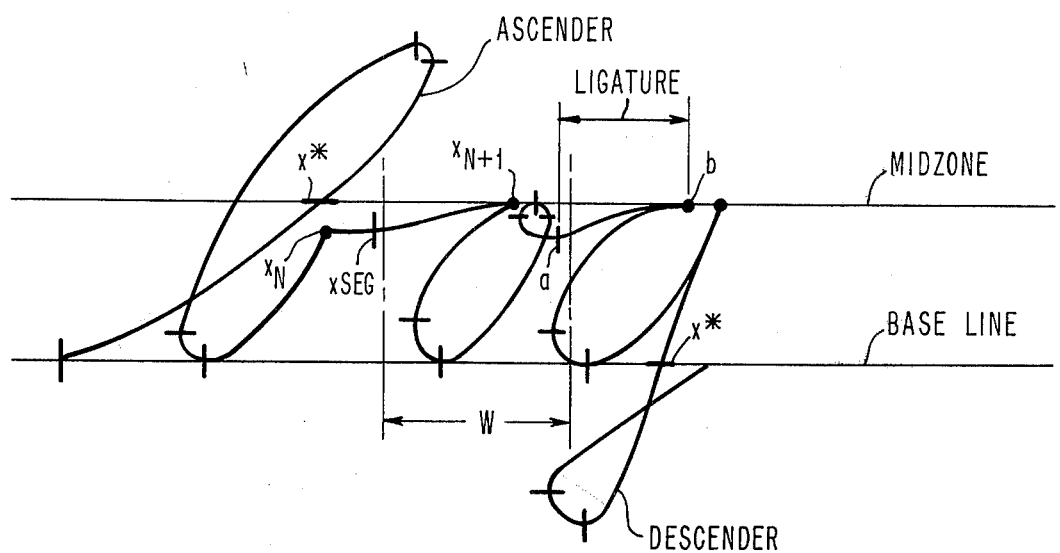
FIG. 1A is a diagrammatic representation of several cursive script characters which clearly illustrate the basic features and terminology of the present invention.

Before proceeding with a detailed description of the flowcharts and finally the detailed operation of the hardware, a general understanding of the underlying concepts of the invention will best be appreciated by referring first to FIG. 1A. As stated previously input to such a segmentation system is positional information provided by any sort of stylus input tablet, a number of which are commercially available. Thus, information about the pen dynamics such as velocity and distance is available from the tablet or may be computed. The coordinate information is analyzed into strokes by straightforward techniques. A stroke is considered to be the fundamental informational element of cursive handwriting, and is demarcated by the extremals in velocity. Thus a stroke detector must compute the velocity in both the x and y directions and determine reversals in the direction of velocity. Pen movement between two successive x extremals is referred to herein as a x—stroke and similarly pen movement between two successive y extremals is referred to herein as a y-stroke. It will be noted that, from the way one is trained to write, the y-strokes contain most of the specific character information, and the x-strokes convey the positional or segmentation information. That is, broadly speaking, a person positions the pen along the line by x motion and then forms the individual characters by moving the pen up and down primarily in the y direction.

Reference should be made to FIG. 1A, briefly, for a clear definition of the terms used subsequently herein. The "base line" is the line which forms the bottoms of ordinary lower case characters without descenders such as the letters $a, e, s, i, o, u$, etc. The "mid zone" is the line along which the tops of ordinary lower case characters without ascenders fall. The "ascenders" themselves comprise the upper strokes of characters such as $f, l, d$, etc. which lie well above the average mid zone. "Descenders" are the lower strokes of such characters as $f, g, y, j$, etc. which descend far beneath the average base line. It should be noted in passing that the base line and mid zone are both estimated based on a sampled input from a particular writer and are further provided with threshold value T, so that extremals will not be missed simply because the writer does not stay precisely on the base line or mid zone as he is writing. In FIG. 1A it will be noted that of the three letters two rest along the base line, ad the tops of the $o$ and $g$ fall substantially along the mid zone line. The ascender on the letter $b$ and the descender on the letter $g$ are also clearly shown.

The basic or raw data which the present segmentation device requires is the location of the extremals, both x and y, and the raw x-y positional data. Within the segmentation device the following operations must be performed. First it is necessary to estimate the base line and the mid zone which estimations are used in identify ascenders and descenders. The intersections of these ascenders and descenders with the mid zone and base line respectively is utilized in the computation of the character center instead of the extremal points themselves which function serves to greatly enhance the accuracy of the present segmentation system. The computation of the running average of the character center in the x direction is performed at each extremal point other than for the ascenders and the descenders, using the actual x coordinates.

It is also necessary to detect significant jumps of the pen. Significant retro-strokes must be continuously looked for. Retro-strokes mean strokes in the minus x direction. Finally it is necessary to calculate the segment placement within the ligature. As stated previously, referring to FIG. 1A, a ligature is a stroke or stroke extension joining two successive characters in cursive writing. The above are the basic steps of the present segmentation method and these will now be discussed in detail with further rationale as to why certain steps are necessary.

Estimation of the mid zone and the base line is quite similar and may be treated together. The $y$ velocity and $y$ extremals are examined. Extremals may be classified easily as maxima or minima according to the change in sign of the velocity. The value of the $y$ extremal at a maxima is used to update the estimate of the mid zone provided it falls within a broad tolerence of the mid zone (for example one-third of the character height). If the extremal lies above the mid zone by more than the specified tolerance then the stroke is determined to be part of an ascender. The following stoke normally completes such an ascender. The same algorithm is used for the base line except that values below the base signify descenders. The extrema are used to update the estimates of the zone positions by a weighted average in the present embodiment. This is important to reduce the effect of misleading $y$ extrema such as might occur at the conclusion of a script $s$ or $b$. It has been found that a simple average is adequate, however, different weightings may be assigned to he old zone location and the current extrema.

Different schemes may be used to start such a sequential process, depending upon the ultimate design of the system. If ruled lines are present on the tablet, as a form of suggestion or guide for the writer then these values i.e., the $y$ coordinates of the lines, may be taken as the starting values. Conversely the user may be asked to write a particular character set, or perhaps a control code, at the start of the document. Alternatively, several characters may be stored at the start of the line and the system will be given the power to backtrack, or run recursively, refining its estimates of the zones. It will be noted that some ambiguity is always possible, (viz: P vs. $p$) which must be removed as by an initiating input, continuous modification of estimates, etc.

In the present embodiment it is assumed that a single line tablet is used and it may be further assumed that a guide line for both base and mid zones is present on the surface of the tablet, however, the actual mid zone and base line estimates are made as a result of the user writing a sample stream of lower case characters from which a running average of base line and mid zone is taken. In addition, the number of characters to be written is known and a rough estimate of average character width W may readily be computed by dividing the total length of the composite sample by the number of characters present.

Means must be provided for finding the $x$-coordinates of ascenders and descenders which are to be utilized in computing the $x$ average or mid point (middle as contrasted with mid zone) of a particular character. The actual $x$-coordinates of the extremals are normally used in the segmentation scheme set forth herein. However, the $x$ values associated with the extremals of ascenders and descenders are very unreliable because even with normally slanted writing such extremals may overlap other characters by a substantial amount. Therefore, when an ascender is encountered its intersection with the mid zone is utilized and when a descender is encountered the $x$-coordinate of its intersection with the base line is used.

Simple forms of interpolation from the extremal values, i.e., the $x$ and $y$ coordinates of the ascenders and decenders are not at all effective. The method disclosed herein is to search back from the extremal value to find the $x,y$ coordinate data for that particular stroke until the intersection with the appropriate zone, i.e., base line or mid-zone is found. The corresponding $x$ value is then taken as the coordinate of the extremal when updating the $x$ coordinate average for the character. Thus, ascenders and descenders are effectively clipped off at the base line and mid-zone for purposes of averaging. Information that an ascender and descender has occurred is saved as it is highly significant in the recognition process.

It should be clearly understood that all of the sampled $x$ and $y$ coordinate data and also the $x$ and $y$ velocity data passes through the present system but that only the $x$ and $y$ displacement data is utilized by the character recognition portion of the system such as disclosed in the previously referenced Harmon patent. The purpose of the present invention is to literally provide a pointer which in effect delineates the point in the continuous stream of $x,y$ coordinate information flowing into the data recognizing portion of such a data recognition system which delineates individual characters. While certain signature verification systems utilize velocity measurements, a simple character recognition scheme such as anticipated in the present invention normally would require only the $x,y$ information and the velocity information may be dispensed with.

The next function that must be provided for in the present system is a method for detecting significant jumps, i.e., significant $x$ displacement of consecutive extremals from the last analyzed extremal. The threshold for segmentation should ideally be approximately one-half of a character width from the last computed mid-range for a given character. However, this is not overly critical. It can be estimated continuously, or updated periodically. For better accuracy, the present embodiment utilizes a "region" system. Two regions are defined based on how far the pen has travelled relative to the expected character width. In the first region, the pen has not yet moved a full character width, so the system is reluctant to segment. Accordingly, a conservative threshold is used, so that the system segments only after an obvious ligature. If, on the other hand, segmentation has not occurred after the pen has travelled one full character width it may be reasonably suspected that the character should be broken. Utilizing the region system this larger traversal tells the system it is in region 2, in which a very small threshold is used in order to break or segment after any small positive $x$ motion. Under no circumstances does segmentation occur on the first two strokes of the character no matter how long they are. It has been noticed that on real data occasionally the scale of the writing changes drastically. An initial stroke may become very long, particularly if it is an ascender, or an arch like $m$ or $n$. Additionally, some sequences may have very small ligatures like $ij$ or $uv$. The region system copes with problems arising due to these situations quite successfully.

When a significant jump is detected it is probably that a ligature has occurred and a mechanism for calculating the particular place to segment the ligature must be provided. That is, the ligature may be lumped entirely with the left-hand character, it may be lumped with the right-hand character, it may be deleted entirely or it may be split between the two characters. The last mentioned approach is utilized herein, because the ligature itself bears important width information, particularly for characters that begin on the right, e.g., $c, a, d, q$. In the case of $r$ and $s$, the ligature may itself be part of the character because of curvature which the stroke detector does not notice. Finally, the present system causes the definition of character width to include the ligature because it is more straightforward.

According to the present embodiment the system stores the left and right coordinates of the ligature and these are used for form a weighted average of the $x$ coordinates. The present embodiment utilizes the following formula to define the segmentation point:
$x(\text{Seg}) = 3/4$ (left coordinate) $+ \frac{1}{4}$ (right coordinate)
The length of the right-hand portion of the ligature is compared to 3/2 (expected character width) to avoid problems when starting up, or when the left-hand character is not well defined. It has been noted experimentally that the precise weighting and thresholds are not critical but it is believed that the threshold and weightings utilized here represent good working compromises.

Before proceeding further with the description of the detailed operation of the embodiment, reference is again made to FIG. 1A for the purpose of defining what is meant by a number of the terms within the subject description. The ascender, decender, mid-zone, and base line were described above with reference to this figure and will not be repeated. A typical ligature is shown between points a and b. An approximate character width W is also illustrated. The extremals are shown as follows: The horizontal bars represent $x$ extremals, that is, where the $x$ direction of velocity is 0 during the writing process. The vertical bars denote $y$ extremals or where the $y$ velocity is 0. The heavy dots indicate areas where both $x$ and $y$ velocities would be 0. A bar is shown along the mid-zone where the ascender for the letter B first crosses the mid-zone. This is the $x$ value that would be utilized for the computations of the $x$ displacement for both the subsequent extremals near the top of the ascender. Similarly a horizontal bar is shown where the descender for the letter G crosses the base line. It is this $x$ displacement value that would be utilized in computing the average $x$ displacement for the two extremals in the descend plate. It will be noted that if the actual $x$ displacement for the extremals were utilized for the ascenders and descenders, then the average displacement value would be badly obscured since even with normal slant the ascenders and descenders clearly overlap the area of the adjacent letter. The two points utilized in the segmentation for the ligature between the character $b$ and the character $o$ are labelled as $x_N$ and $x_{N+1}$ as the two extremal values belonging to this ligature. The segmentation point for this ligature is clearly denoted as $x_{Seg}$. The point $x_{Seg}$ is utilized to separate or form a line of demarcation between the $x,y$ coordinates belonging to the character $b$ and whatever character might follow, i.e., in this case the character $o$.

Figure 3B:
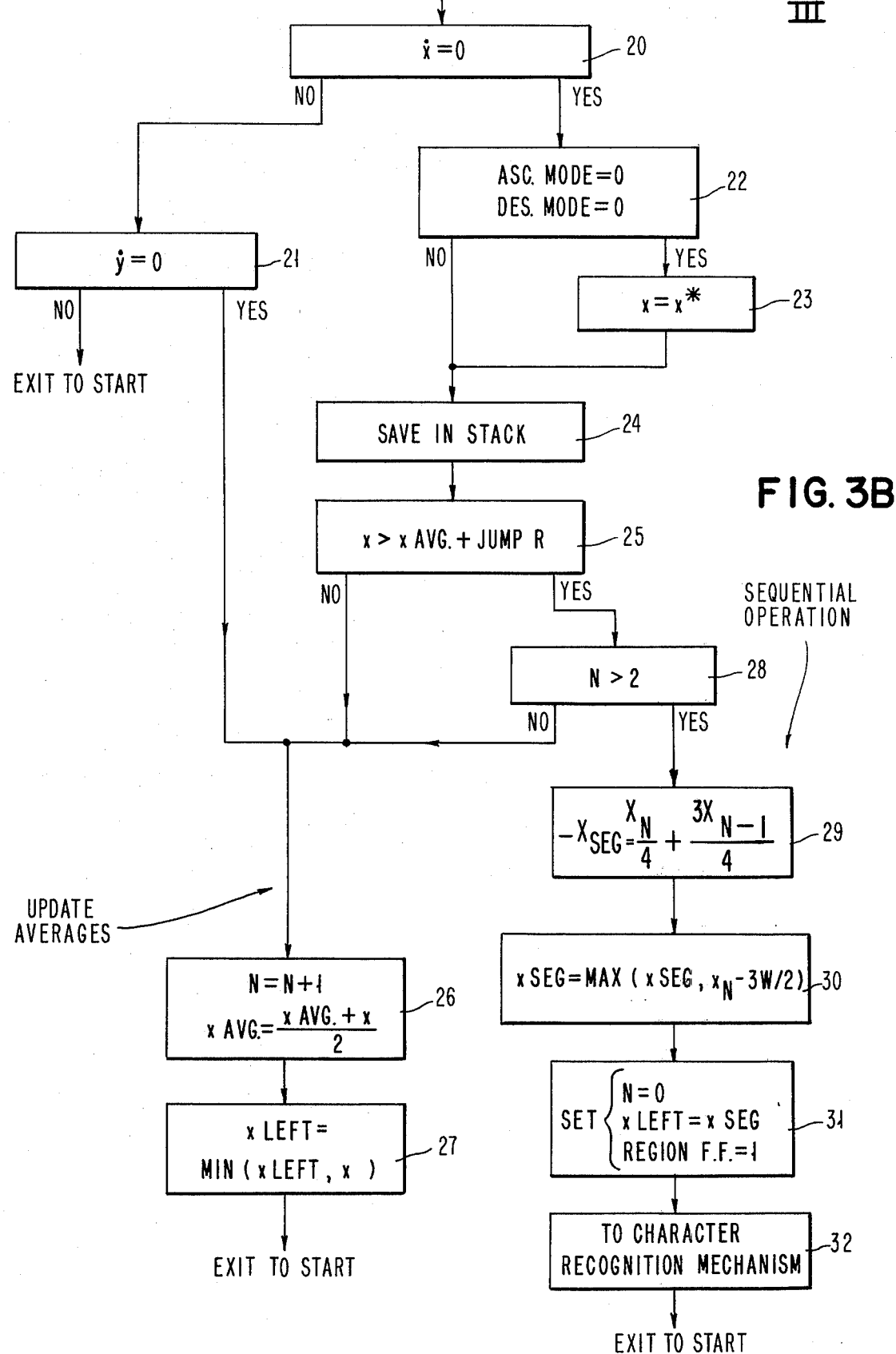

Referring now to the flowchart of FIGS. 3A and 3B the essential features of the present segmentation mechanism are quite clearly shown. It should be reiterated that as a person writes on the tablet a continuous sequence of $x,y$ displacement sampling points is taken so that there is a continuous stream of digitized $x,y$ data available to the system from which continuous $x,y$ velocity data is available. In the upper portion of the flowchart designated I only the $x$ and $y$ displacement data are considered. Block 1 labelled "Start" indicates the beginning point through which each consecutive bit of data must flow that is, $x$ and $y$ coordinate. Block 2 signifies the test that is made wherein the current $x$ value is involved in a subtraction operation with the leftmost extremal $x$ coordinate i.e., $x$ (left) which is saved for each character to determine if the new $x$ is within the pre-computed boundary region W for a character. If the result of the subtraction operation of block 2 is "yes" block 3 indicates that the REGION flip flop is set. If not the flowchart proceeds to block 4 where the current $y$-displacement value is compared with the previously determined mid-zone. If it is greater the system proceeds to block 5 where the Ascend Mode flip-flop is checked. If it is not set at 0 it branches directly to block 12. If it is set to 0, this causes the flip-flop to be set to a 1 and the current $x$ value to be stored into the $x^*$ REGISTER and then branches to block 5. What has just happened is a test for an ascender. If the test is affirmative the ascender mode flip-flop must be set so that the system knows that it is in this mode of operation and the $x$ value of the midzone intercept must be marked and saved.

If the result of the test made in block 4 had been 0 the system would have continued to block 7 wherein the Ascend Mode flip-flop would be set to a 0. This operation provides automatic housekeeping whereby as soon as the $y$ values for an ascender return back below the mid-zone the flip-flop will automatically be reset.

Proceeding to block 8, a test is made to see if the current $y$ value is less than the predetermined base line value. If yes, the Descender Mode flip-flop is tested in step 9 and if it is previously set to a 1, the system will proceed directly to block 12. If not it proceeds to block 10 wherein the Descender Mode flip-flop is set to a 1 and as in block 6 the $x$-displacement value of the intercept of the stroke with the base line is stored in the $x^*$ register. After this the system can proceed to block 12. Block 11 is a flip-flop mode setting block which performs the necessary hardware housekeeping when a descender again rises above the base line.

Block 12 examines the current $y$ velocity value to test for a $y$ extremal. If the velocity vector $\dot{y}$ is not equal to 0 the system immediately branches to block 20. If it is equal to 0 it means that a $y$ extremal has been encountered and the system branches to block 13. At this point a sign test is made to determine whether it is a top extremal or a bottom extremal. Assume first that it branches to block 14. At this block a test is made to see if it is the top of an ascender or the top of a lower case letter. This is done by performing the operation $\dot{y} <$ BASE $-$ T. If the answer to this test is yes, the system branches to block 15 where the controls are set so that the $x$ displacement value used in subsequent averaging computation is the value currently in the $x$ Register. In other words the branch including block 15 means that the system has detected a $y$ extremal on a descender. If the answer to the test of block 14 had been no the system would have branched to block 16 which would have indicated in effect that the $y$ extremal was at the bottom of a conventional lower case letter. Block 16 comprises an averaging operation wherein base value is updated by adding a current $y$ displacement value to the previous base value and dividing by 2. In this fashion any tendency of a writer to drop slightly below the base line will be taken into consideration with greater reliability.

Returning to block 13 it is assumed that the sign test indicated that the $y$ extremal was located at the top of the stroke. In this event the system would have proceeded to block 17 wherein a further test is made to see if the system branches to blocks 18 or 19. The tests in blocks 17, 18 and 19 are essentially the same as in 14, 15 and 16 and will not be repeated. It is noted, however, that block 18 indicates that the $y$ extremal is in a ascender requiring a transfer of the $x^*$ value and block 19 is an averaging operation for the mid-zone valve and indicates that a decision was made that the $y$ extremal was at the top of a lower case letter.

Thus the test made in section II of the flowchart determined whether a particular extremal was an ascender or descender and set certain controls whereby the proper $x$ values would be considered in subsequent $x$ displacement averaging operations. Block 20 is in the segment of the flowchart designated by the III wherein a test is made for $x$ extremals and if the test if affirmative either a segmentation operation occures or a $x$ average update occurs. In addition the $x$ average update occurs where there is no $x$ extremal but there is a $y$ extremal. This is determined by the test made in block 21. If block 21 produces a negative answer the system immediately exits to start, i.e., in block 1. It will be noted that all intermediate $x,y$ displacement values which pass through the system were neither an $x$ or a $y$ extremal are 0 pass through that portion of the flowchart designated by I to block 12. At the point the system branches to block 20 and thence to block 21 and back to start without any further operations occurring.

Proceeding now to block 20 a test is made to determine if the current point being investigated is an $x$ extremal. This is determined as will be remembered by seeing if the value $\dot{x} = 0$. It is assumed now that an affirmative test is made in block 20 which means that an $x$ extremal has been detected. In this case the system branches to block 22 wherein both the ascend mode and descend mode flip-flops are tested. If they are on 0 the system branches to block 23 where the current $x^*$ value is set into the current $x$ Register and this value saved in a stack as shown in block 24. If the Ascent Mode flip-flop and/or Descent Mode flip-flop were set to a 1 the current $x$ value would have been directly stored in this stack. It will be noted that the stack saves the $x$ displacements for the current $x_N$ and the last $x$-extremal $x_{N-1}$ which are utilized in the segmentation operation.

Upon completion of the operation in block 24 the system proceeds directly to block 25. In this block a tet is made to see if a new $x$ extremal displacement is greater than the currently computed $x$ Avg displacement plus the Jump (R). If the answer to this test is affirmative the system branches to block 28 where a test is made for the total number of $x$ extremals detected in the current character being analyzed. If the result of this test is affirmative the system proceeds to block 29 and if negative to block 26. The test in block 28 is a quanatative test which experience has shown gives improved results in that it eliminates improper segmentation which might otherwise occur due to an insufficient number of strokes.

Assuming a affimative answer to the test of block 28, block 29 performs an arithmetic determination of where segmentation is to occur. As will be noted from the formula:
$x_{Seg.} = (x_N/4) + (3x_{N-1}/4)$.
From the above formula it will be noted that the previous $x$ extremal value for the ligature is more heavily weighted than the current value $x_N$. It will also be noted that these two vlaues were saved in a register stack in block 24.

After the operation in block 29 is completed, the system proceeds to block 30. This block performs an additional check on the segmentation point. The check performed is expressed by the formula $x$ Seg. = max ($x$ Seg.) $x_N - 3W/2$) wherein W = the average character width. This formula means that the actual segmentation point used is selected as the maximum of the segmentation value computed in block 29 in the quantity $x_N - 3W/2$. This is to provide a better segmentation point where there is an excessively long ligature.

Block 31 resets the controls previously set during the system operation after the segmentation is complete. The three operations performed in this block are the resetting of the N counter to zero, loading the quantity $x$ Seg into te $x$ Left register and finally resetting the Region F. F. to "one".

The exit from block 31 goes to block 32 wherein a segmentation indication is sent to the actual character recognition mechanism such as disclosed in the previously referenced Harmon patent. As stated previously, the present invention is directed solely to a segmentation mechanism, it being specifically noted that many different character recognition algorithms are available in the art wherein Harmon represents a particular case. The segmentation mark provided by the present invention thus is actually a pointer into the long list of $x$-$y$ displacements produced by the stylus tablet which indicates to the character recognition mechanism where a character begins and/or ends. It is further specifically to be noted that the character recognition mechanism forms no part of the present invention.

The exit from the character recognition mechanism returns the system to starting block 1 and the analysis of new character is ready to begin.

Returning again to block 25 and 28 a negative test in these blocks takes us to block 26 as does an affirmative output from block 21. Blocks 26 and 27 update the value $x$ Avg with a new value for a particular extremal or $x^*$ value when ascenders or descenders are involved. Block 26 increments the N (number of extremals encountered) counter and recomputes the value $x$ Avg. This value is updated as will be seen by adding it to the current $x$ displacement value for the current extremal being evaluated and dividing the sum by 2. The exit from block 26 goes to block 27 wherein the quantity $x$Left is continuously monitored by selecting the minimum of the previous $x$Left quantity and the current value of $x$ being analyzed. This allows the system to pick the leftmost $x$ displacement value for a retrostroke as described previously. The exit from block 27 returns again to the beginning or start block 1.

Figure 1B:
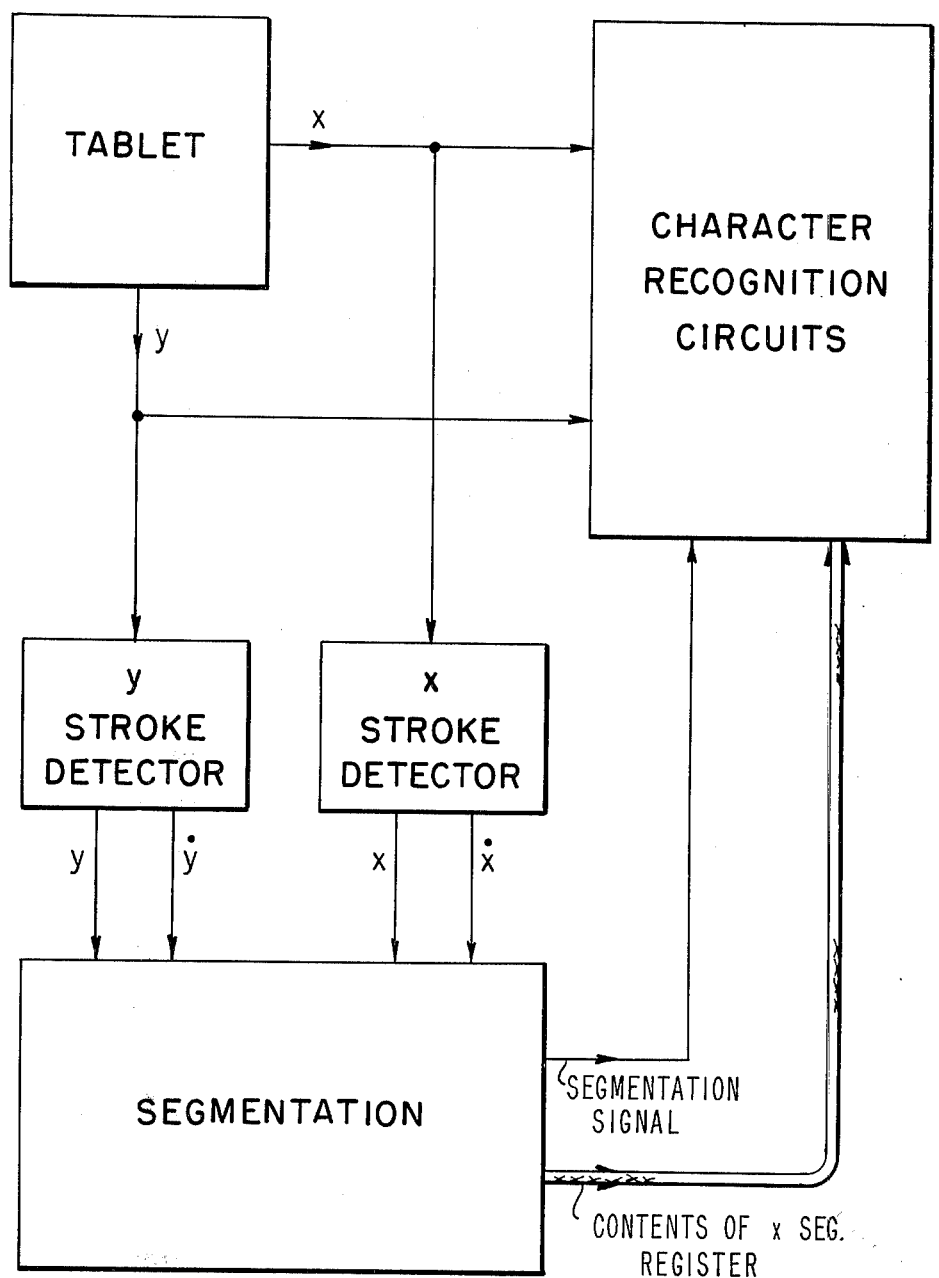
FIG. 1B is a functional block diagram of an overall cursive script character recognition system incorporating the segmentation mechanism of the present invention.

Having described the details of the fundamental operating characteristics of the present segmentation system reference will now be made to FIGS. 1 and 2 (2A to 2M) wherein a specific hardware embodiment suitable for performing the instant segmentation operation is disclosed. FIG. 1 is a very general functional block diagram of an overall character recognition system. The large block labled "Character Recognition Circuits" as stated previously does not form a part of the present invention and is not treated in detail other than to reiterate that any good character recognition algorithm such as disclosed in the Harmon patent would be suitable for use with the present invention. It is of course to be noted that by using the present segmentation system it is not necessary for the character recognition circuitry of Harmon to wait for a entire line of script to be written before segmentation can be accomplished but rather the character recognition algorithm may start immediately upon the receipt of a segmentation pointer from the present segmentation mechanism, i.e., block 32 of the flowchart of FIG. 3B.

The tablet providing the continuously sampled x-y displacement data is necessary to the present segmentation mechanism and as indicated in FIG. 1 and also in FIG. 2 provides x-y data to the blocks labeled x stroke detector and y stroke detector respectively. These two blocks perform the function of continuously monitoring the x and y displacement data and forming continuous subtractions whereby the velocity values $\dot{x}$ and $\dot{y}$ may be obtained. The x, $\dot{x}$ and the y, $\dot{y}$ data is continuously fed into the segmentation mechanism as was apparent from the previous description of the flowchart and this data is used in the instant segmentatation system to determine the proper segmentation points for a given writing sample.

The large box at the bottom of FIG. 1 labeled "Segmentation" is the primary mechanism included in the composite logical schematic diagram of FIG. 2 and the output of this block is a "segmentation signal" which signifies to the character recognition circuitry that the segmentation value or pointer is ready on the appropriate cable for transmission to the character recognition circuit.

It is again reiterated that in order for the present system to start running the constants comprising base line, mid zone value, and an exected character width W are needed. These values, as stated previously, could be roughly estimated, but preferably would be obtained by having a person who is going to write on the system, write a sample sentence, word, etc., by which these values could be relatively accurately ascertained. Further, for the sake of simplicity the tablet has been stated to have only one line written thereon at a time and at the end of one line of writing the tablet would be erased and a new line begun on substantially the same line. This is a useful form leading to a economical tablet, but it would be relatively simple to provide some sort of a ruled tablet and have people write a plurality of lines thereon without adding much additional complexity to the system. In this case, there would simply have to be an indexing computation adding to the y-displacement values for the two constants representing mid zone and base line. Also some estimate of the threshold value T must be given in order to allow slight variations as writing goes slightly above or below the base line or the mid zone as is normally the case with people using cursive script. All of these derived constants are considered to be information "given" to the system and are in effect initiating values which must be entered prior to actually starting the mechanism.

As will be apparent, the functional circuitry appearing on FIGS. 2A through 2E comprises the primary arithmetic and logic units as well as the holding registers necessary for running the system. In addition, there are a number of condition flip-flops at the bottom of FIGS. 2F and 2G. The majority of the circuitry appearing on FIGS. 2F through 2I are gating circuits and cables necessary for switching and data flow operations inherent in the system. The timing circuitry for controlling the five clock sequences appear on FIGS. 2J through 2M and consist primarily of a series of interconnected single shots (SS) and clock pulse generators (CPG) which latter perform the same function as the sigle shots but wherein they are able to run through a prescribed sequence without any testing operations. The same result could be achieved with one signal shot and as many delay circuits and tap points as required for the delayed timing pulses. As will also be noted a number of the single shots and pulse generators are ititiated by plural input OR circuits which obviously are branching inputs from elsewhere in the system timing controls.

The function of the circuitry of the composite of FIG. 2 is quite straightforward and its general philosophy has been set forth in considerable detail with respect to the flowcharts. The subsequent inclusion of the specific timing sequences or microprograms as they are referred to herein set forth in minute detail exactly what operation occurs with each clock or timing pulse. Finally, there is included a detailed description of the operation of the overall system wherein the timing sequences are set forth and described in detail verabally referring to the particular hardware actuated and the function performed for all of these sequences. It will be noted that the first three timing or microprogram sequences, i.e., the overall microprogram (OV), the x stroke detector microprogram (XSD) and the y stroke detector microprogram (YSD) perform operations generally included in the region of the flowchart designated I and including block 1 through 11. The y microprogram ($\dot{y}$) performs essentially those operations included within that portion of the flowchart designated II.

Finally, the functions performed by the $\dot{x}$ microprogram ($\dot{x}$) are those functions performed by that part of the flowchart designated III including blocks 20 through 32.

Any function designated in the microprogram sequences may be quite easily understood by referring to the functional portions of the logical schematic diagram in FIGS. 2A through 2E. However, as stated before, a detailed description of the timing circuitry and the data flow paths energized, reference may be made to the last section of the specification entitled, "Detailed Description of the Disclosed Embodiment of FIGS. 2A through 2M".

---

MICRO PROGRAM SEQUENCES
1. Overall Microprogram (OV)
OV-1  Note - only used on the first sequence
following a "start" signal.
Gate current x value to X-LEFT Register
Reset Base Register to its initial value
Reset MID Register to its initial value
(Supplied Externally)
OV-2  Reset X-LEFT F.F. to "O"
Gate current x value to Minuend Register
Gate X-LEFT Register to Subtrahend Register →OV-2a OV-2a Is sign bit of result = "O"?

-continued

MICRO PROGRAM SEQUENCES yes →OV-3
      no →OV-2b

OV-2b Gate Result Register of Subtractor to Comp. Register No.2
Gate 4 W to Comp. Register No.1

→OV-2c

OV-2c Is Comp. Register No.1 > Comp. Register No.2 yes →$\dot{x}$ - 25
      no →OV-6

OV-3 Gate result Register of Subtractor to Comp. Register No.1
Gate W Register to Comp. Register No.2

→OV-4

OV-4 Is Comp. Register No.1 > Comp. Register No.2 yes →OV-5
      no →OV-6

OV-5 Set "Region" F. F. to "1"

→OV-6

OV-6 Gate current y to Comp. Register No.1
Gate MID Register to Comp. Register No.2

→OV-7

OV-7 Is Comp. Register No.1 > Comp. Register No.2?

yes →OV-8
      no →OV-10

OV-8 Is Ascender Mode F. F. = 0?

yes →OV-9
      no →XSD-1
      →OV-9

OV-9 Set Ascender mode F. F. to 1
Gate current x to x* Register
Set x* F. F. to "1"

→x SD-1

OV-10 Reset Ascender Mode F. F. to 0

→OV-11

OV-11 Gate Bare Register to Comp. Register No.1
Gate current y to Comp. Register No.2

→OV-12

OV-12 Is Comp. Register No.1 > Comp. Register No.2 yes →OV-13
      no →OV-15

OV-13 Is Descender Mode F.F. = 0 yes →OV-14
      no →XSD-1

OV-14 Set Descender Mode F. F. to 1
Gate Current x to x* Register
Set x*, F. F. to "1"

→XSD-1

OV-15 Set Descender Mode F. F. to 0

→XSD-1

2. X Stroke Detector Micro Program (XSD)

XSD-1 Gate current x value to Minuend Register
Gate ($X_{f}$-1) Register to Subtrahend Register

→XSD-2

XSD-2 Is result of Subtraction = 00—00?

yes →$\dot{y}$SD-1
      no →x SD-3

XSD-3 Is new sign = old sign?

yes →XSD-4
      no →XSD-5

XSD-4 Gate current x value to ($x_f$-1)

→$\dot{y}$ SD-1

XSD-5 Set XSD F. F. to "1"
Gate new sign to Old Sign Register (x)
Gate current x value to ($x_{i-1}$) Register -continued

MICRO PROGRAM SEQUENCES

→$\dot{y}$ SD-1

3. Y Stroke Detector Micro Program (YSD)

YSD-1 Gate current y value to Minuend Register
Gate ($Y_f$-i) Register to Subtrahend Register

→YSD-2

YSD-3 Is new sign = old sign?

yes →YSD-4
      no →YSD-5

YSD-4 Gate current y value to ($y_f$-1) Register

→$\dot{\overset{x}{X}}$-1

YSD-5 Gate new sign to Old Sign Register
Gate current y value to ($Y_{f-1}$) Register
set y SD F. F. to "1"

→$\dot{y}$-1

4. $\dot{y}$ Micro Program ($\dot{Y}$)

$\dot{y}$-1 Test Old $\dot{y}$ sign Register minus →$\dot{y}$-2
      plus →$\dot{y}$-8

$\dot{y}$-2 Gate current y value to Minuend Register
Gate Mid Register to Subtrahend Register →$\dot{y}$-3

$\dot{y}$-3 Gate result of substraction to Comp. Register No.1
Gate T Register to Comp. Register No.2

→$\dot{y}$-4

$\dot{y}$-4 Is Comp. Register No.1 > Comp. Register No.2 yes →$\dot{x}$-1
      no →$\dot{y}$-5

$\dot{y}$-5 Gate MID Register to Augend Register of adder
Gate current y value to Addend Register of adder →$\dot{y}$-6

$\dot{y}$-6 Shift Sum Register one place to right

→$\dot{y}$-7

$\dot{y}$-7 Gate Sum Register to Mid Register

→$\dot{x}$-1

$\dot{y}$-8 Gate B Register to Minuend Register of subtractor
Gate T Register to Subtrahend Register of subtractor →$\dot{y}$-9

$\dot{y}$-9 Gate result of substraction to Comp. Register No.1
Gate current y to Comp Reg. No.2

→$\dot{y}$-10

$\dot{y}$-10 Is Comp. Register No. 1 > Comp. Register No.2 yes →$\dot{x}$-1
      no →$\dot{y}$-11

$\dot{y}$-11 Gate Base (B) Register to Augend Register of adder
Gate current y value to Addend Register of adder →$\dot{y}$-12

$\dot{y}$-12 Shift sum Register one place to the right
Register →$\dot{y}$-13

$\dot{y}$-13 Gate Sum Register to B Register

→$\dot{x}$-1

5. $\dot{x}$ Microprogram ($\dot{x}$)

$\dot{x}$-1 Is X SD F. F. = 1?

yes →$\dot{x}$-2
      no →$\dot{x}$-8

$\dot{x}$-2 Gate current x stroke Register to previous x stroke Register
Gate current x value to current x stroke Register $\dot{x}$-3 Gate x Ave. Register to Augend Register
Gate Jump cable to Addend Register →$\dot{x}$-4

$\dot{x}$-4 Gate current x or x* to Comp. Register No.1

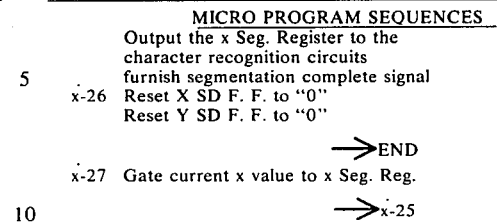

MICRO PROGRAM SEQUENCES
Gate Sum Register to Comp. Register No.2

→x-5 x-5 Is Comp. Register No.1 > Comp Register No.2?

yes →x-6
    no →x-9 x-6 Gate Register N to Comp. Register No.1
Set Comp. Register No.2 = 00—10

→x-7 x-7 Is Comp. Register No.1 > Comp. Register No.2 ?

yes →x-15
    no →x-9 x-8 Is y SD F. F. = 1?

yes →x-9
    no →x-25 x-9 Increment Register N
Gate x Total Register to Augend Register
Gate current x or x* to Addend Register →x-10 x-10 Gate Sum Register to Dividend Register
Gate Sum Register to x Total Register
Gate Register N to Divisor Register →x-11 x-11 Gate Quotient Register to x Ave

→x-12 x-12 Gate Left Register to Comp. Register No.1
Gate current x or x* to Comp. Register No.2

→x-13 x-13 Is Comp. Register No.1 > Comp. Register No.2?

yes →x-14
    no →x-26 x-14 Gate current x or x* to Left Register

→x-26 x-15 Gate ½ Previous x stroke value to the Augend Register
Gate ¼ Previous x stroke value to the Addend Register →x-16 x-16 Gate Sum to Sum Hold

→x-17 x-17 Gate Sum Hold to Augend Register

→x-18 x-18 Gate ¼ current x stroke value to Addend Register

→x-19 x-19 Gate Sum to x Seg. Register

→x-20 x-20 Gate W Register to Augend Register
Gate ½ W to Addend Register

→x-21 x-21 Gate Sum Register to Subtrahend Register
Gate current x or x* to Minuend Register →x-22 x-22 Gate x Seg. Register to Comp. Register No.1
Gate result of subtraction to Comp. Register No.2

→x-23 x-23 Is Comp. Reg. No.1 > Comp. Register No.2 yes →x-25
    no →x-24 x-24 Gate result of subtraction to x Seg. Reg.

→x-25 x-25 Reset N Register to 00—00
Gate x Seg. Register to Left Register
Reset Region F. F. to "0"
Reset x SD F. F. to "0"
Reset y SD F. F. to "0"
Gate current x stroke Register to x Ave Register
Reset x Ave Register to 00—00

MICRO PROGRAM SEQUENCES
Output the x Seg. Register to the character recognition circuits furnish segmentation complete signal x-26 Reset X SD F. F. to "0"
Reset Y SD F. F. to "0"

→END x-27 Gate current x value to x Seg. Reg.

→x-25

DETAILED DESCRIPTION OF THE OPERATION OF THE SPECIFIC EMBODIMENT OF THE FIGS. 2A–2M

The following is a detailed description of the presently disclosed preferred embodiment, indicating in a detailed fashion the sequence of events in terms of hardware function that occur with each of the microprogram pulses. It will be remembered that, in the previous section, the microprogram sequences are specified in detail as well as the functions which they perform. In this section, the actual wires, cables and functional units are described.

It will be noted that the actual clock pulses are produced by the signal shot shown in FIS. 2J–2M. The various branching and testing functions are performed by hardware shown elsewhere in the composite of FIGS. 2A–2M as set forth hereinafter.

Figure 2A:
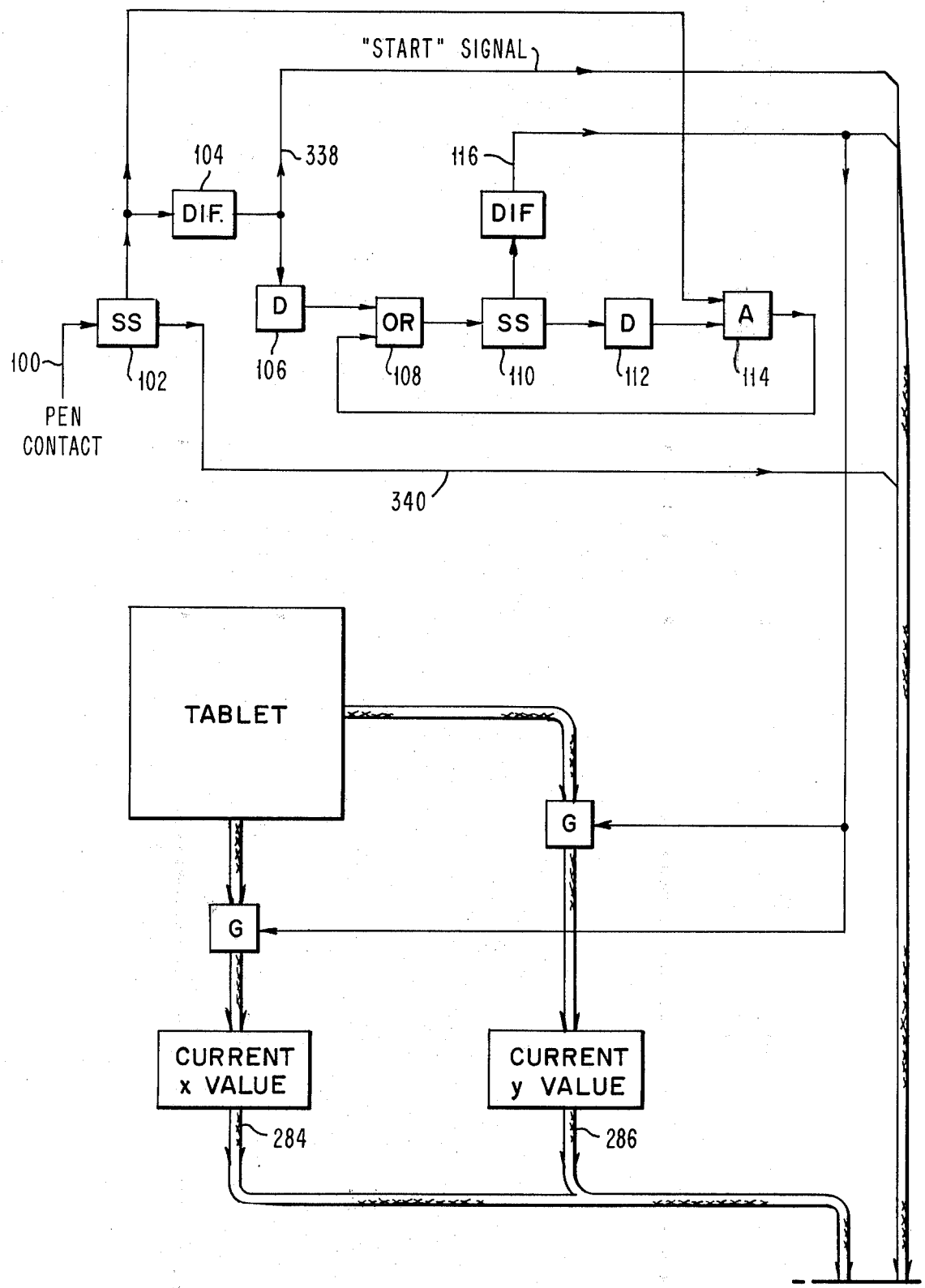

Referring specifically to FIG. 2A, any suitable tablet can be used that provides a digitized x output and a digitized y output. When the pen is touched to the tablet after a fairly long period, line 100 will become active to turn "ON" single shot 102. Single shot 102 has a period long enough to bridge normal pen lifts which occur in continuous writing. If the writer pauses long enough, as he might do at the end of a sentence or a paragraph, single shot 102 will turn "OFF". This will produce a sharp pulse on wire 340 and the purpose of this pulse will be explained later.

The leading edge of the pulse produced by the turning "ON" of single shot 102 is differentiated by the DIF circuit 104 to produce a sharp pulse which is called the "START" signal. This pulse also extends through the DELAY circuit 106 and OR circuit 108 to turn "ON" single shot 110. It should be noted that as long as single shot 102 is in its "ON" state AND circuit 114 is enabled. When single shot 110 turns "OFF" a pulse is produced which extends through DELAY circuit 112, AND circuit 114 and OR circuit 108 to again turn "ON" signal shot 110. In this manner, signal shot 110 becomes an oscillator which periodically samples the tablet to get the current x and y values. The current x value is kept in a register and this value will appear on cable 284. The current y value is also kept in a register and this value will appear on cable 286. When the writer lifts his pen from the tablet for a time sufficient to indicate a significant pause, single shot 102 will turn "OFF" and AND circuit 114 will be disabled thus stopping the pulses on wire 116.

Figure 2B:
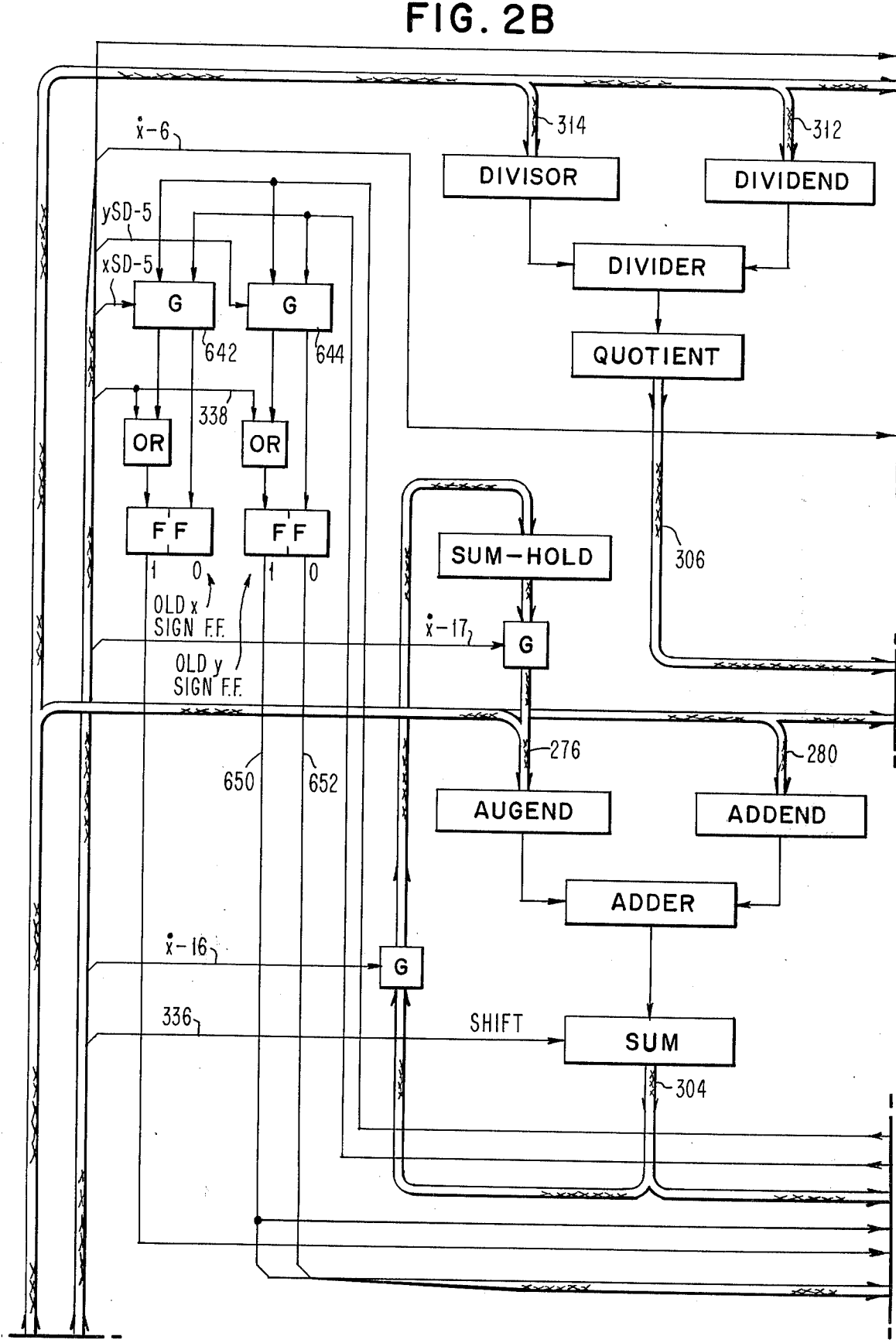
Figure 2D:
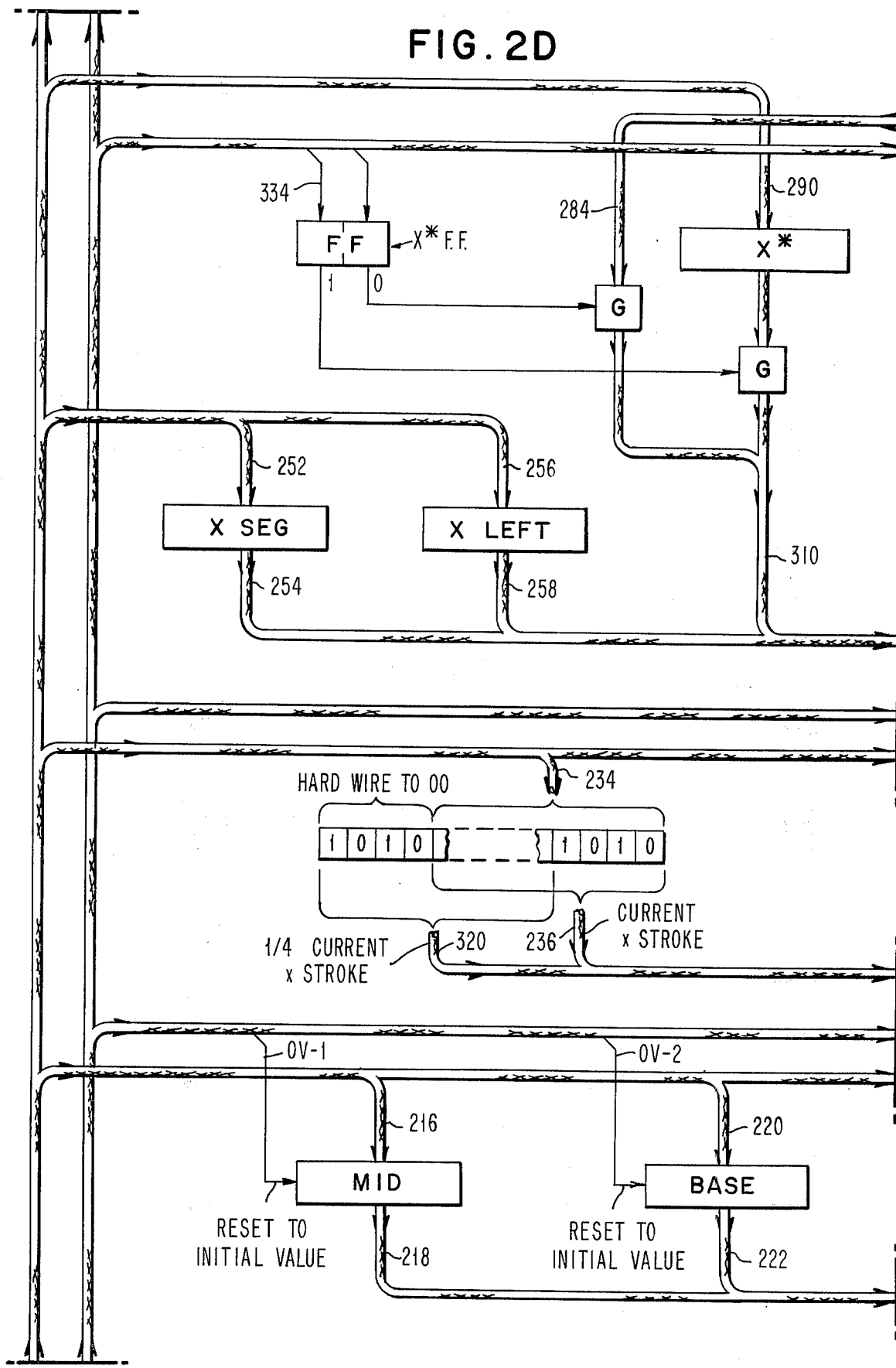
Figure 2E:
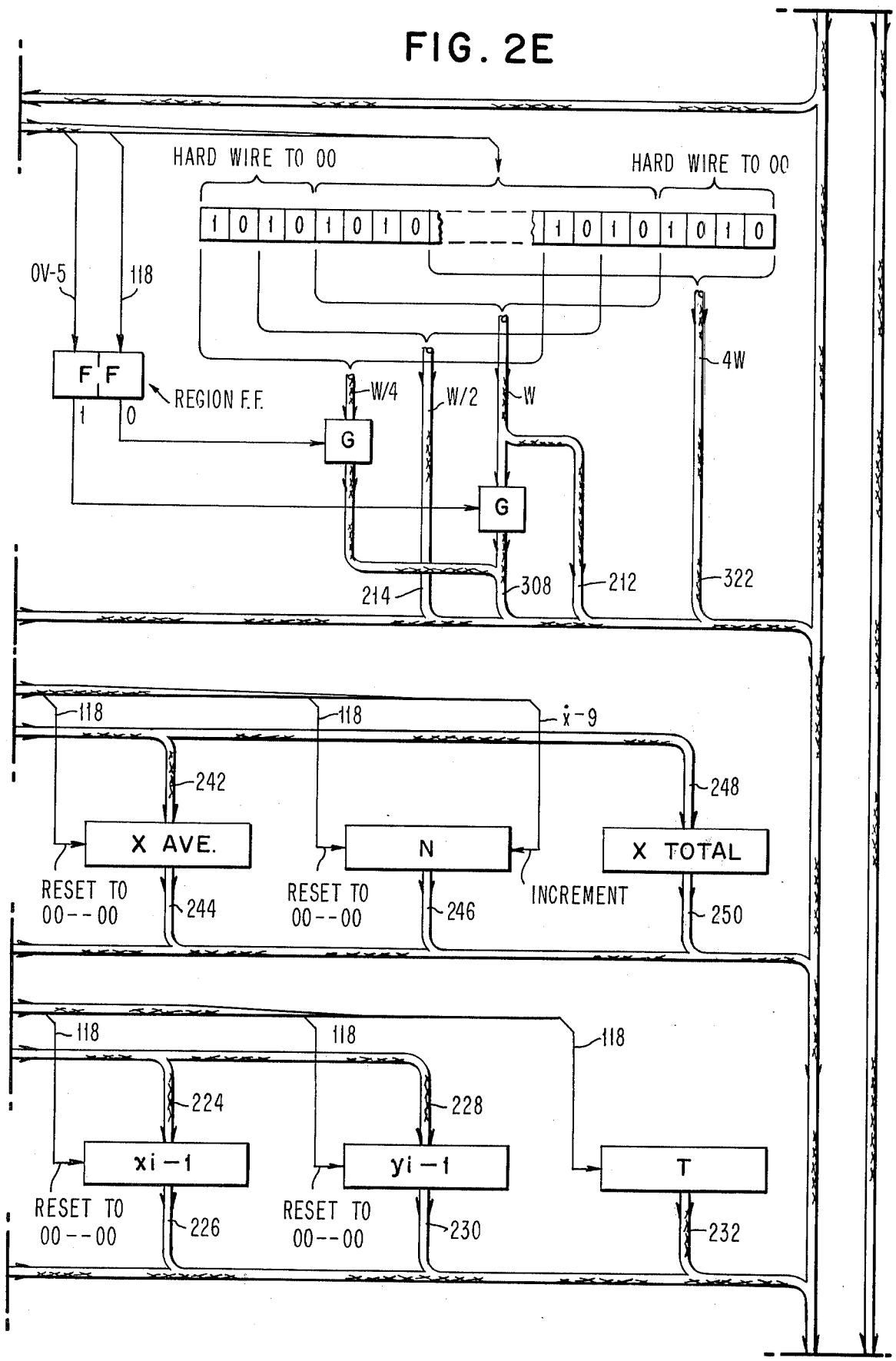
Figure 2F:
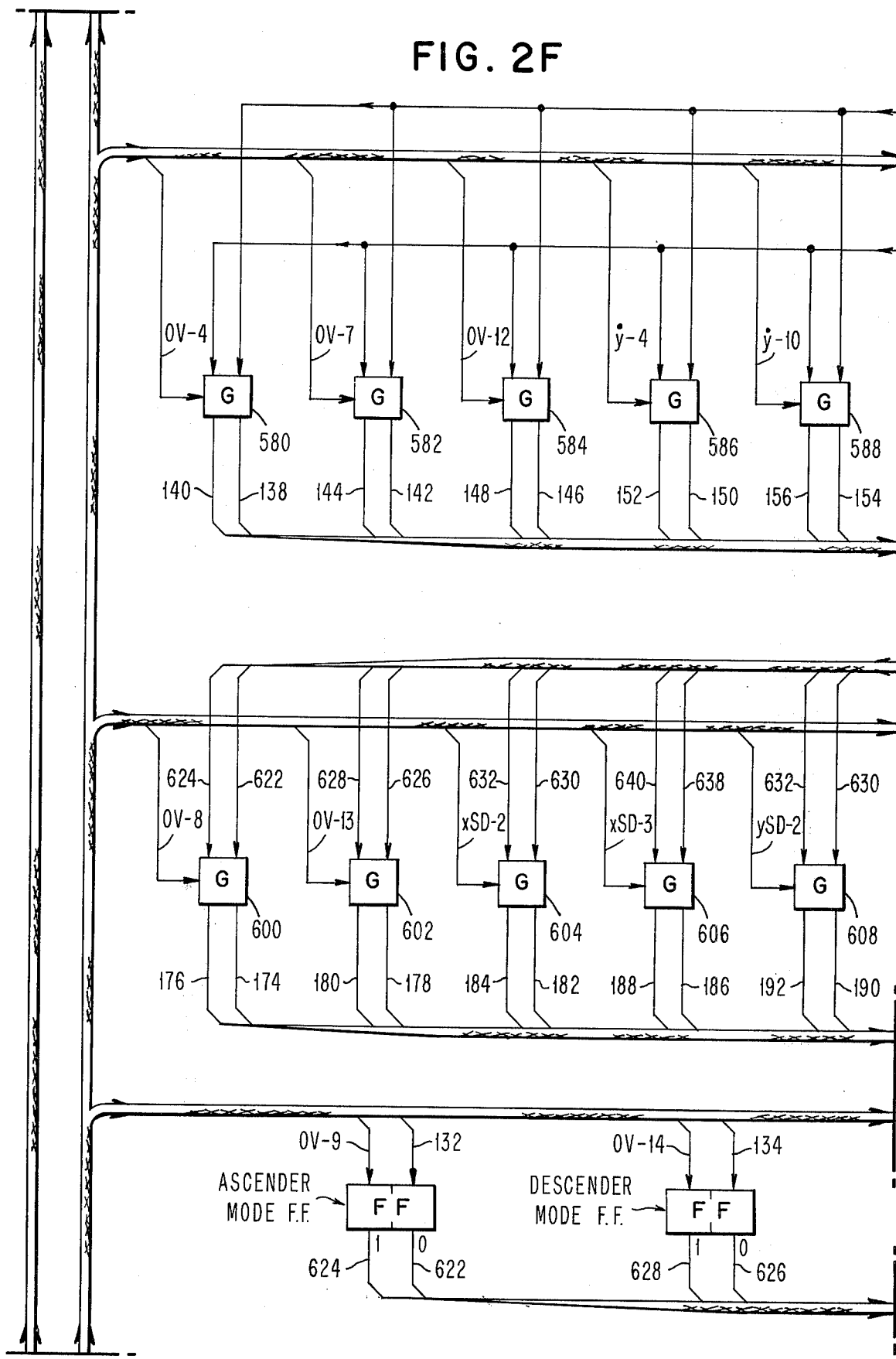
Figure 2G:
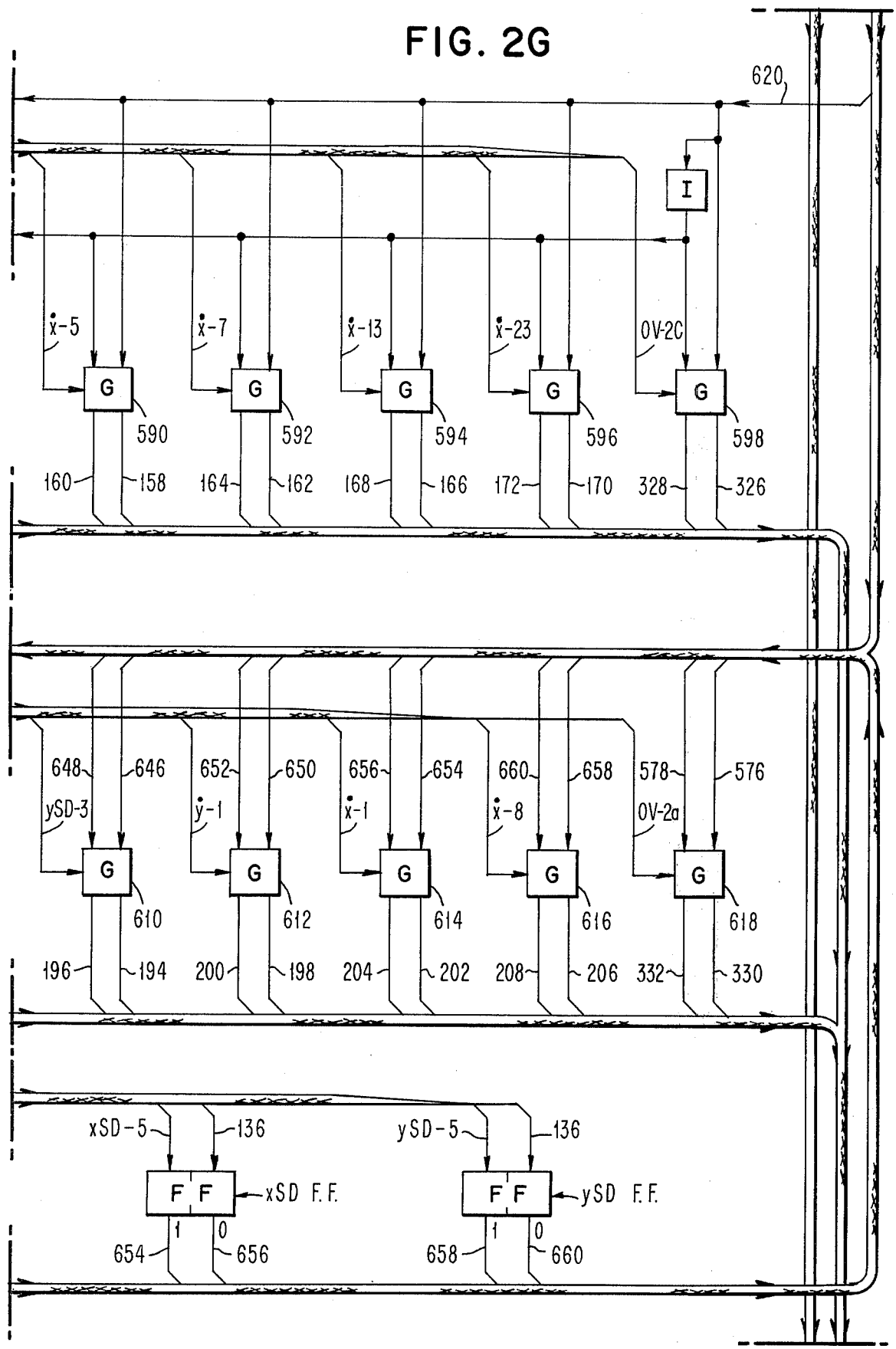
Figure 2H:
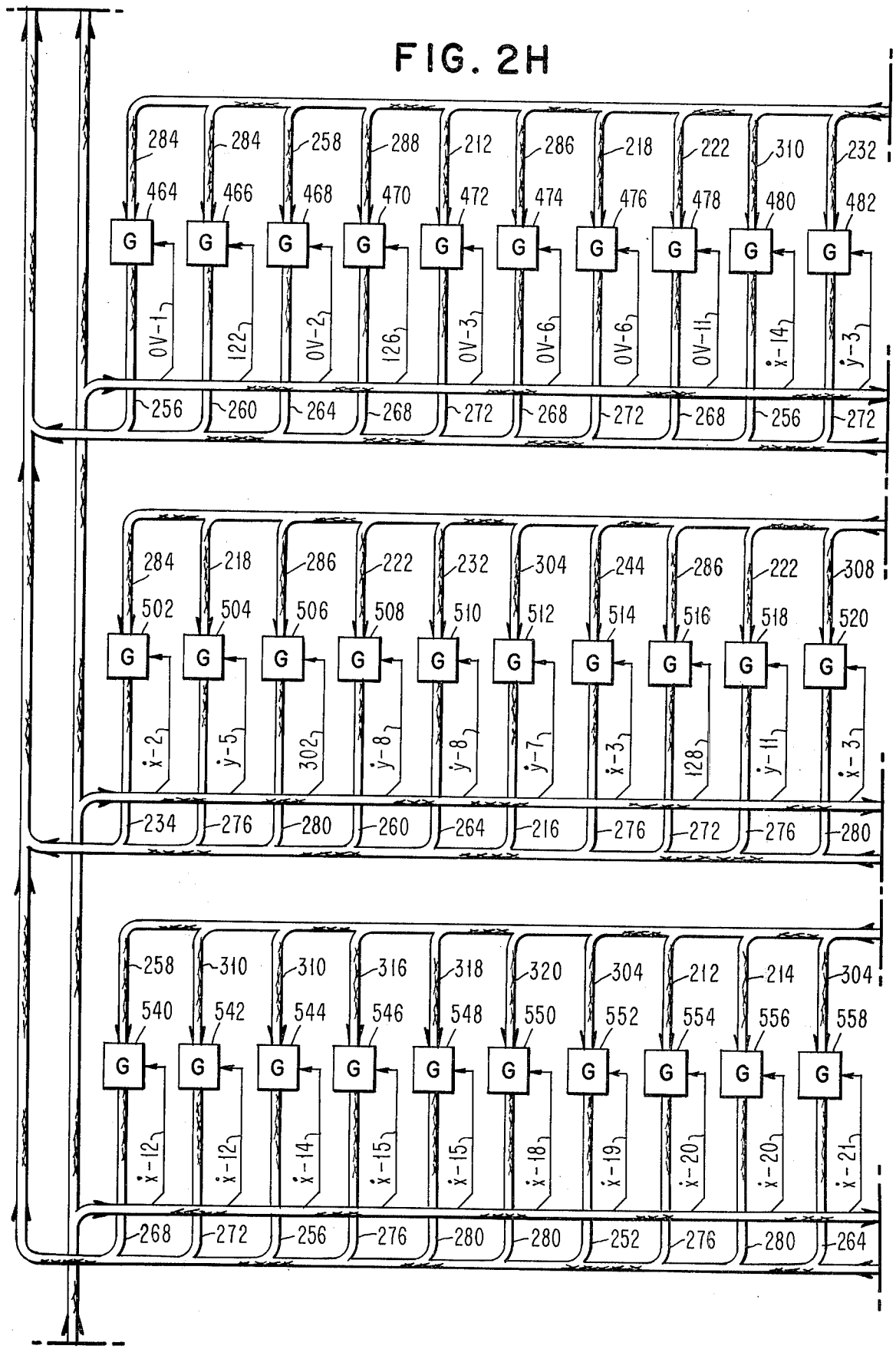
Figure 2I:
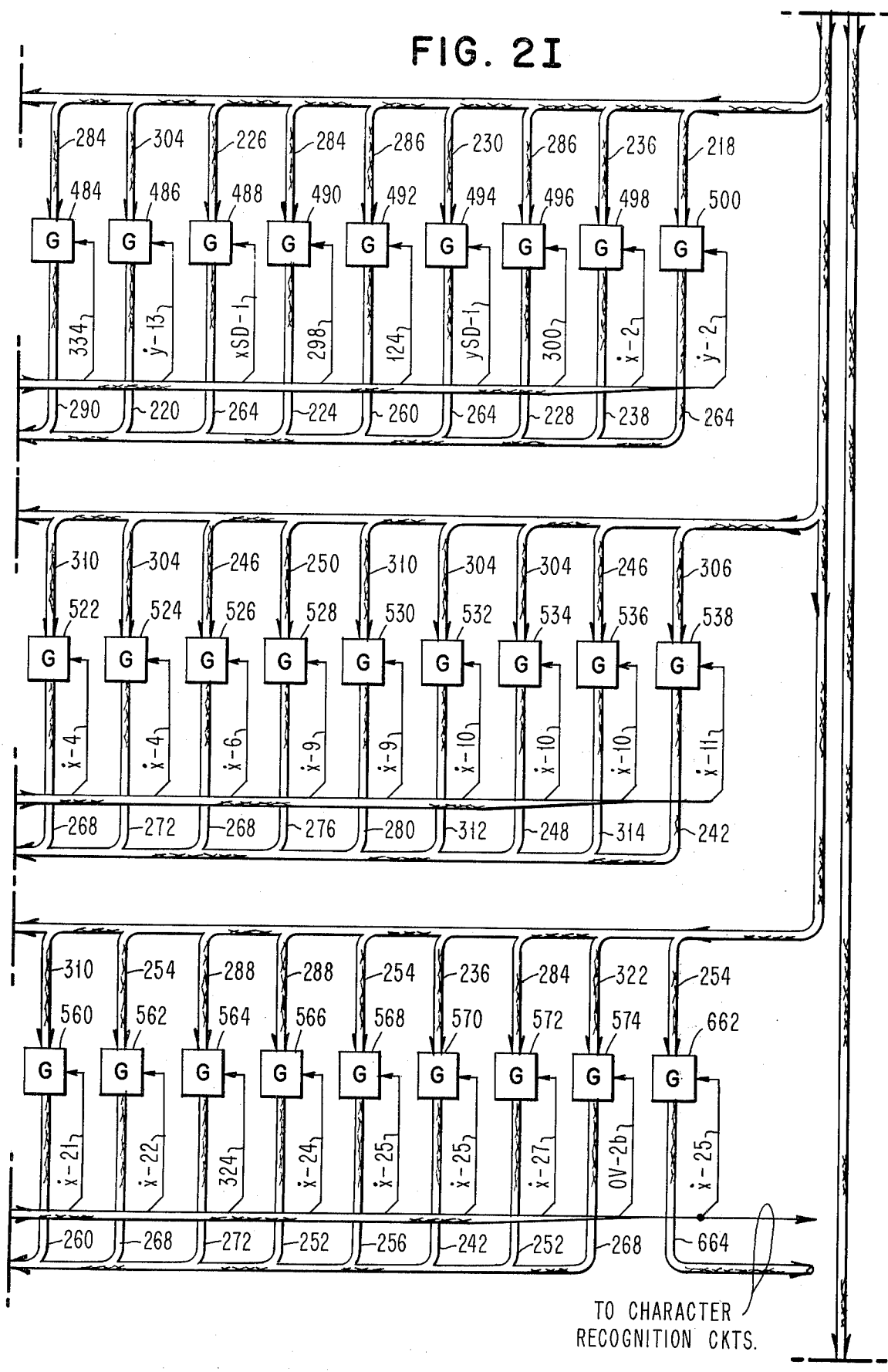
Figure 2J:
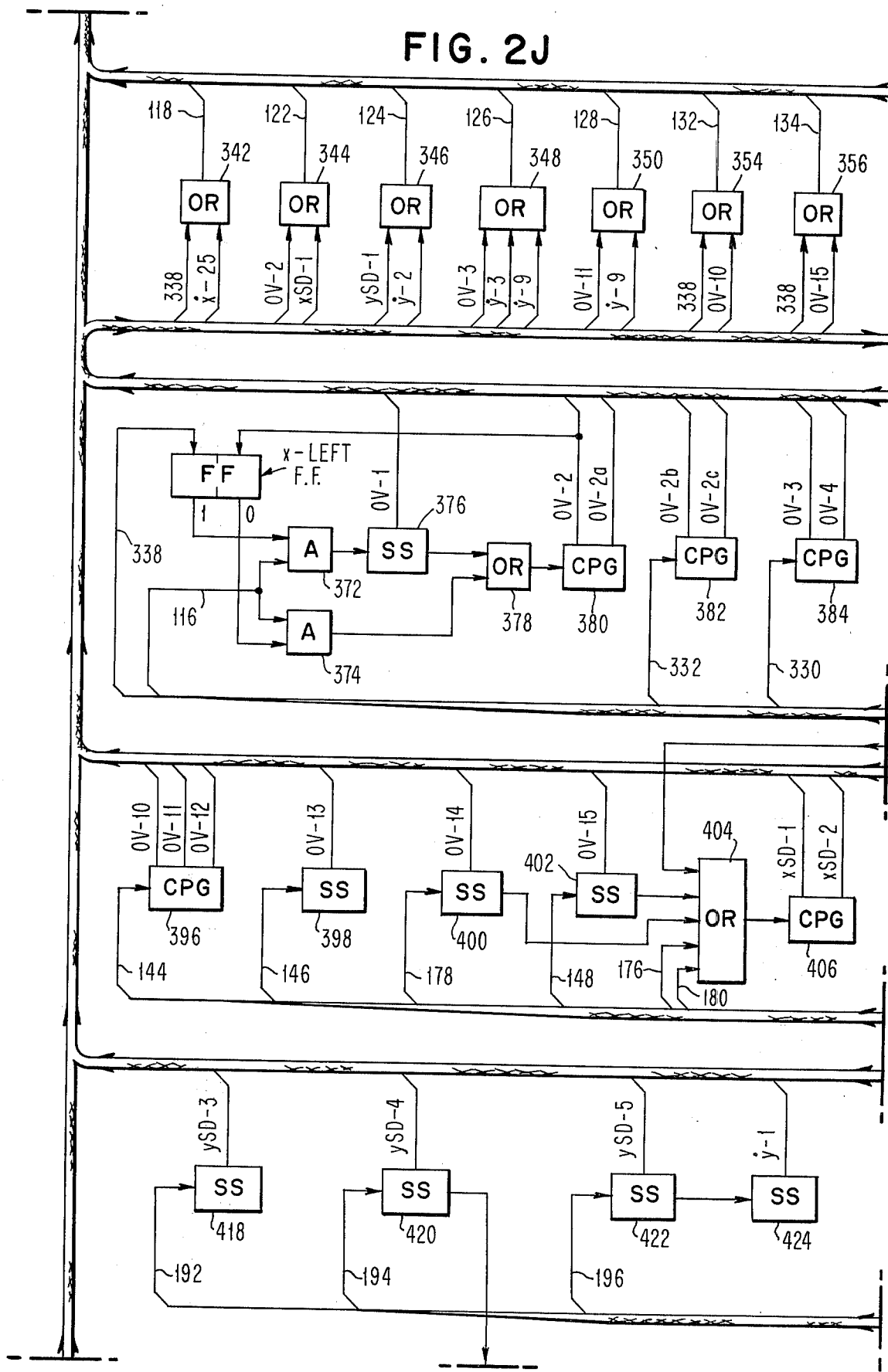

The pulse on wire 338 extends to FIG. 2J where it is used to set the x-LEFT flip-flop to its 1 state. This enables AND circuit 372 so that the first pulse on wire 116 passes through it and turns "ON" single shot 376 in order to produce the OV-1 pulse. The OV-1 pulse extends to FIG. 2H where it is applied to gate 464 in order to gate the current x value which is on cable 284 to cable 256 which is the input cable to the x-LEFT register on FIG. 2D. The OV-1 pulse also extends to FIG. 2D where it is used to reset and MID and the BASE registers to their initial values.

On FIG. 2J, when signal shot 376 turns "OFF", a pulse is produced which extends through OR circuit 378 to turn "ON" the pulse generator 380 which produces the pulses OV-2 followed by the OV-2a. The OV-2 pulse resets the x-LEFT flip-flop to its 0 state thus disabling AND circuit 372 and enabling AND circuit 374 so that the next pulse on wire 116 will extend through AND circuit 374 and the OR circuit 378 to turn "ON" the pulse generator 380. In this manner, the OV-1 pulse is only produced the first time after a "START" signal is produced and the only purpose of the OV-1 pulse is to gate the current x value to the x-LEFT register.

On FIG. 2J, the OV-2 pulse extends through OR circuit 344 to wire 122. Wire 122 extends to FIG. 2H where it is applied to GATE 466 in order to gate cable 284 to cable 260. Cable 284 is the current x value and cable 260 is the input cable to the Minuend register on FIG. 2C. On FIG. 2H, the OV-2 pulse is applied to GATE 468 in order to gate cable 258 to cable 264. Cable 258 is the output cable of the x-LEFT register on FIG. 2D and cable 264 is the input cable for the Subtrahend register on FIG. 2C.

On FIG. 2G the OV-2a pulse is applied to GATE 618 in order to test the sign bit of the result register of the subtractor. If this bit is a 0, a pulse will appear on wire 330 and, if this bit is a 1, a pulse will appear on wire 332. These wires extend to FIG. 2J where a pulse on wire 330 will turn "ON" pulse generator 384 and a pulse on wire 332 will turn "ON" pulse generator 382. Assuming that the latter happened, the OV-2b pulse will be produced.

The OV-2b pulse extends to FIG, 2I where it is applied to GATE 574 in order to gate cable 322 to cable 268. The cable 322 carries the value of 4W from register 291 on FIG. 2E. Cable 268 is the input cable for compare register No. 1 on FIG, 2C. On FIG, 2K, the Ov-2b pulse extends through OR circuit 370 to wire 324. Wire 324 extends to FIG. 2I where a pulse on it is applied to GATE 564 in order to gate cable 288 to 272. Cable 288 is the output cable of the Result register of the Substractor and cable 272 is the input cable to the compare register No. 2. These registers are shown in FIG. 2C.

The OV-2c pulse extends to FIG. 2G where it is applied to GATE 598 in order to test the output of the Compare unit. If compare Register No. 1 is greater than Comapre Register No. 2, a pulse will appear on wire 326 and, if this is not the case, a pulse will appear on wire 328. Wire 326 extends to FIG. 2L where a pulse on it will pass through OR circuit 454 to turn "ON" signal shot 456 in order to produce the x-25 pulse. Wiere 328 extends to FIG. 2K where a pulse on it will pass through OR circuit 388 in order to start the pulse generator 390.

The OV-3 pulse will next be described. On FIG. 2J, the OV-3 pulse extends through OR circuit 348 and wire 126. Wire 126 extends to FIG. 2H where a pulse on it is applied to GATE 470 in order to gate cable 288 to cable 268. Cable 288 is the output cable of the result register of the substractor and cable 268 is the input cable to Compare Register No. 1.

The OV-3 pulse extends to FIG. 2H where it is applied to Gate 472 in order to gate cable 211 to cable 272. Cable 212 carries the value of W from FIG. 2E and cable 272 is the input cable for Compare Register No. 2 on FIG. 2C.

The OV-4 pulse extends to FIG. 2F where it is applied to GATE 580 to test the output of the Compare unit. If Compare Register No. 1 is larger than Compare Register No. 2, a pulse will appear on wire 138. If this is not the case, a pulse will appear on wire 140. These wires extend to FIG. 2K where a pulse on wire 138 will turn "ON" single shot 386 and a pulse on wire 140 will extend through OR circuit 388 to start pulse generator 390.

The OV-5 pulse extends to FIG. 2F where it is used to set the Region flip-flop to its 1 state.

The OV-6 pulse extends to FIG. 2H and is applied to GATE 474 in order to gate cable 286 to cable 268. Cable 286 carries the current y value from FIG. 2A and cable 268 is the input cable to Compare Register 1 on FIG. 2C. Also on FIG. 2H, the OV-6 pulse is applied to GATE 476 in order to gate cable 218 to cable 272. Cable 218 is the output cable of the MID register on FIG. 2D ad cable 272 is the input cable to Compare Register No. 2 on FIG. 2C.

On FIG. 2F, the Ov-7 pulse is applied to GATE 582 in order to test the output of the Compare unit. If Compare Register No. 1 is greater than Compare Register No 2, a pulse will appear on wire 142. If this is not the case, a pulse will appear on wire 144. These wires extend to FIG. 2K where a pulse on wire 142 will turn "ON" single shot 392 and a pulse on wire 144 will start the pulse generator (CPG) 396.

The OV-8 pulse extends to FIG. 2F where it is applied to GATE 600 in order to test wire 622 and 624 which come from the Ascender mode flip-flop also on FIG. 2F. if this flip-flop is in its 0 state a pulse will appear on wire 174. If it is in its 1 state a pulse will appear on wire 176. These wires extend to FIG, 2K where a pulse on wire 174 will turn "On" single shot 394 and a pulse on wire 176 will extend through OR circuit 404 to start the pulse generator 406.

The OV-9 pulse extends to FIG. 2F where it is used to set the Ascender Mode flip-flop to its 1 state. On FIG. 2K, the OV-9 pulse extends through OR circuit 366 to wire 334. Wire 334 extends to FIG. 2J where a pulse on it is applied to GATE 484 in order to gate cable 284 to cable 290. Cable 284 carries the current x value and cable 290 is the input cable to the x Register on FIG. 2D. Wire 334 also extends to FIG. 2D where a pulse on it will set the x flip-flop to its 1 state.

The OV-10 pulse extends to FIG. 2J where a pulse on it will pass through OR circuit 354 to wire 132. Wire 132 extends to FIG. 2F where a pulse on it will reset the Ascender Mode flip-flop to its 0 state.

The OV-11 pulse extends to FIG. 2H where it is applied to GATE 478 in order to gate cable 222 to cable 268. Cable 222 is the output cable of the BASE Resister on FIG. 2D and cable 268 is the input cable for compare register No. 1 on FIG. 2C. On FIG. 2J, the OV-11 pulse extends through OR circuit 350 to wire 128. Wire 128 extends to FIG. 2H where a pulse on it is applied to GATE 516 in order to gate to cable 286 to cable 272. Cable 286 carries the current y value and cable 272 is the input cable to Compare Register No. 2.

The OV-12 pulse extends to FIG. 2F where it is applied to GATE 584 in order to test the Compare unit. If the Compare Register No. 1 is greater than compare register No. 2, a pulse will appear on wire 146. If this is not the case, a pulse will appear on wire 148. These wires extend to FIG. 2J where a pulse on wire 146 will turn "ON" single shot 398 and a pulse on wire 148 will turn "ON" single 402.

The OV-13 pulse extends to FIG. 2F where it is applied to GATE 602 in order to test the state of the Descender Mode flip-flop. If this flip-flop is equal to 0, a pulse will appear on wire 178 and if it is equal to 1, a pulse will appear on wire 180. These wires extend to FIG. 2J where a pulse on wire 178 is used to turn "ON" single shot 400 and a pulse on wire 180 will extend through OR circuit 404 to start the pulse generator 406.

The OV-14 pulse extends to FIG. 2F where it is used to set the Descender Mode flip-flop to its 1 state. On FIG. 2K, the OV-14 pulse extends through OR circuit 366 to wire 334. Wire 334 extends to FIG. 2D where a pulse on it is used to set the $x$ flip-flop to its 1 state. On FIG. 2I, the pulse on wire 334 is applied to GATE 484 to gate cable 284 to cable 290. Cable 284 carries the current $x$ value and cable 290 is the input cable to the $x$ register. Wire 134 also extends to FIG. 2F where a pulse on it is used to reset the Descender Mode flip-flop to its 0 state.

The next sequence to be described is called the $x$ Stroke Detector sequence or microprogram and this is abbreviated $xSD$.

On FIG. 2J the $xSD$-1 pulse extends through OR circuit 34 to wire 122. Wire 122 extends to FIG. 2H where a pulse on it is applied to GATE 466 in order to gate cable 284 to cable 260. Cable 284 carries the current $x$ value and cable 260 is the input cable to the Minuend Register on FIG. 2C. On FIG. 2I, the $xSD$-1 pulse is applied to GATE 488 in order to gate cable 226 to cable 264. Cable 226 is the output cable of the $xi$-1 register and cable 264 is the input cable to the Subtrahend Register on FIG. 2C.

The $xSD$-2 pulse extends to FIG. 2F where it is applied to GATE 604 in order to test the result of the subtraction. If this result is all 0's, a pulse will appear on wire 182. If this is not the case, a pulse will appear on wire 184. Wires 182 and 184 extend to FIG. 2K where a pulse on wire 182 will pass through OR circuit 414 to start the pulse generator 416. A pulse on wire 184 will turn "on" single shot 408.

The $xSD$-3 pulse extends to FIG. 2F where it is applied to GATE 606 in order to test the output of the exclusive OR circuit 634 on FIG. 2C. If the sign bit of the Result register of the Subtractor is equal to the old $x$ sign, a pulse will appear on wire 186. If the sign is not equal, a pulse will appear on wire 188. These wires extend to FIG. 2K where a pulse on wire 186 will turn "ON" single shot 410 and a pulse on wire 188 will turn "ON" single shot 412.

Figure 2K:
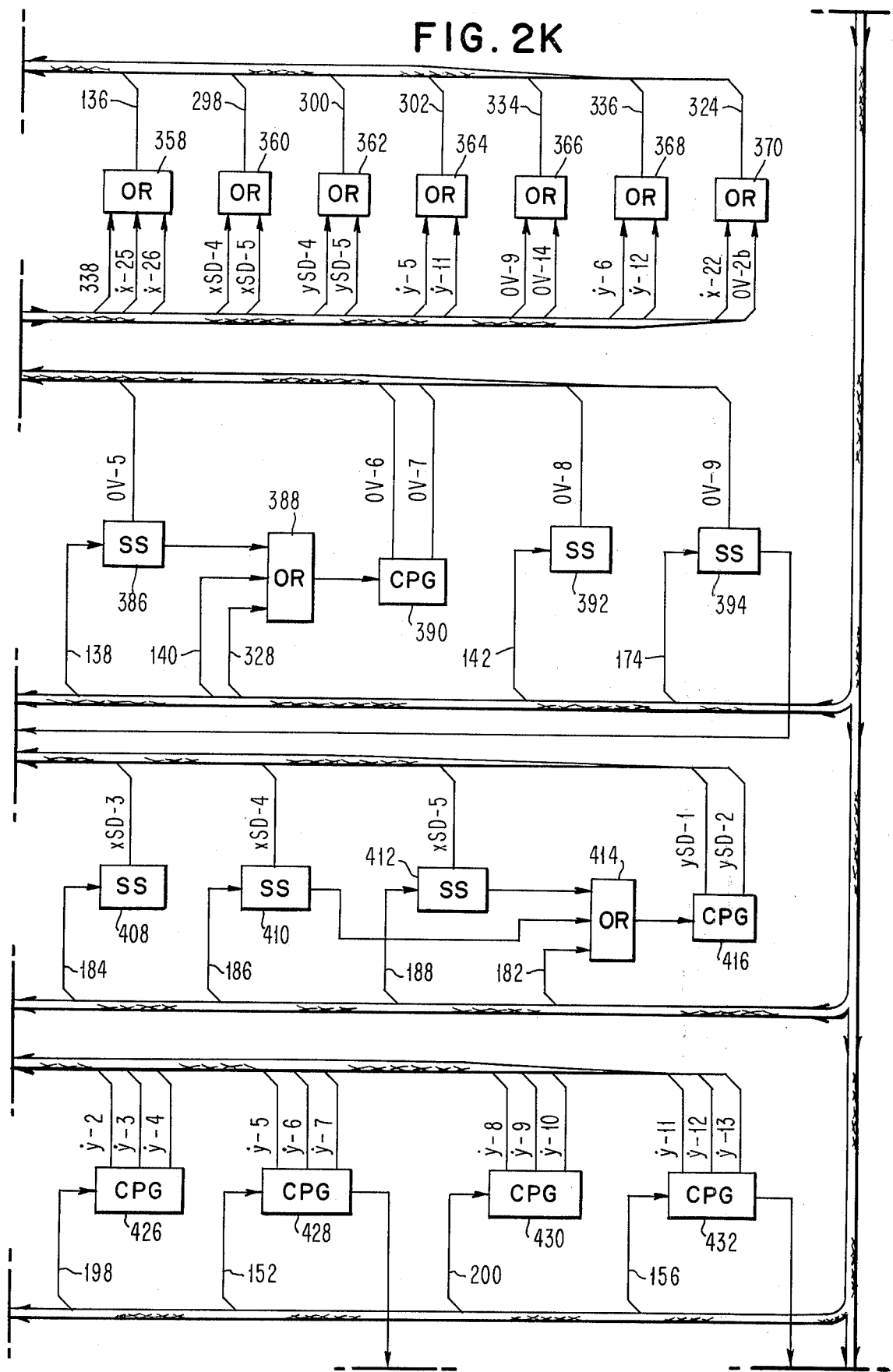
Figure 2L:
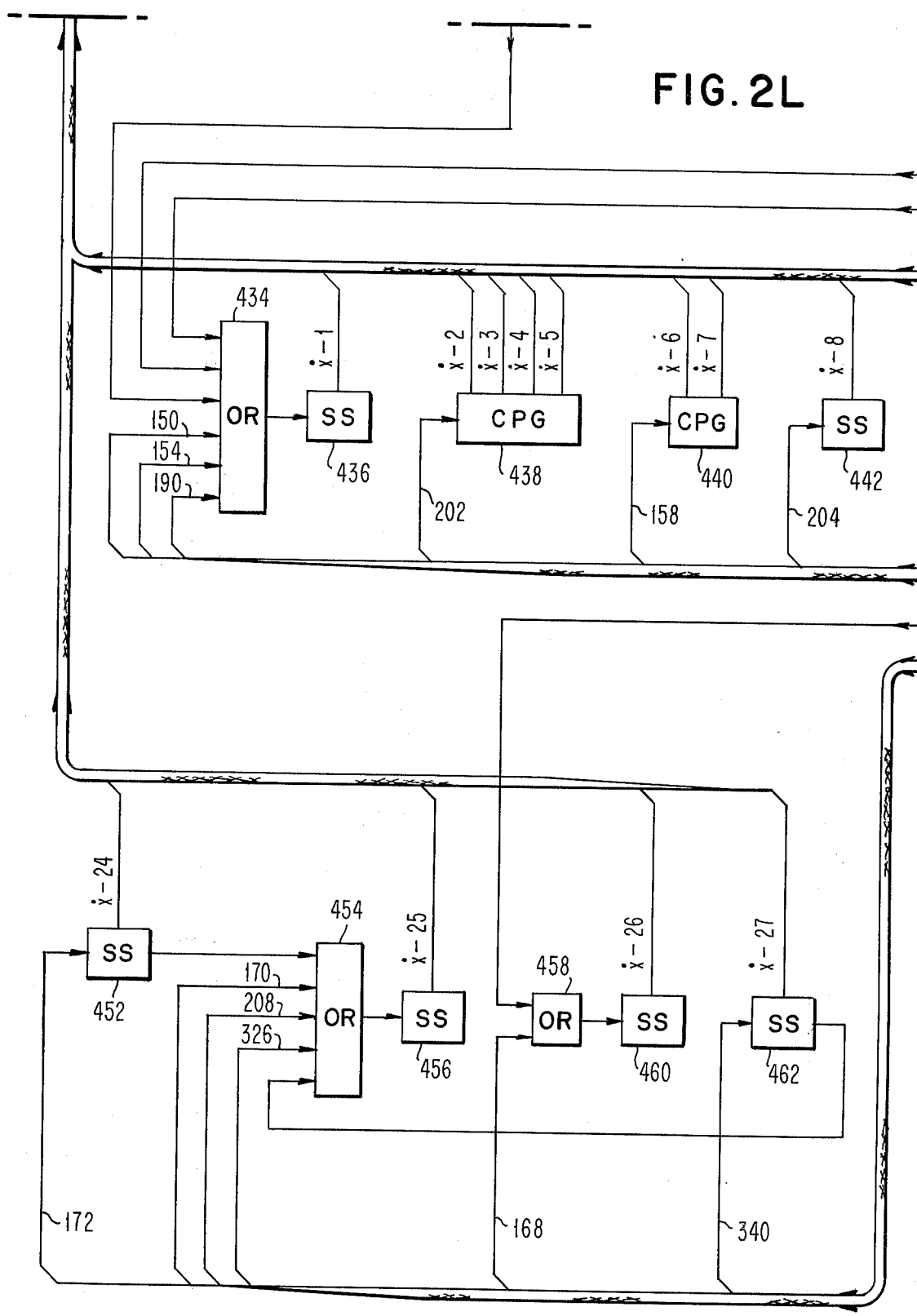

On FIG. 2K, the $xSD$-4 pulse extends through OR circuit 360 to wire 298. On FIG. 2I the pulse on wire 298 is applied to GATE 490 in order to gate cable 284 to cable 224. Cable 284 carries the current $x$ value and cable 224 is the input cable to the $x(i$-1$)$ Register. The $xSD$-5 pulse extends to FIG. 2G where it is used to set the $xSD$ flip-flop to its 1 state. On FIG. 2B, the $xSD$-5 pulse is applied to GATE 642 in order to gate the new sign to the old $x$ sign flip-flop. On FIG. 2K, the $xSD$-5 pulse extends through OR circuit 360 to wire 298. As explained previously, this gates he current $x$ value to the $x(i$-1$)$ register.

The next sequence to be described is the $y$ stroke detector sequence or microprogram. This is abbreviated $ySD$ On FIG. 2J, the $ySD$-1 pulse extends through OR circuit 346 to wire 124. Wire 124 extends to FIG. 2I where the pulse on it is applied to GATE 492 in order to gate cable 286 to cable 260. Cable 286 carries the current $y$ value and cable 260 is the input cable to the Minuend Register. On FIG. 2I, the $ySD$-1 pulse is applied to GATE 494 in order to gate cable 230 to cable 264. Cable 230 is the output cable of the $y(i$-1$)$ Register and cable 264 is the input cable of the Subtrahend Register.

On FIG. 2F, the $ySD$-2 pulse is applied to GATE 608 in order to test the Result Register of the Subtractor on FIG. 2C. If this result is all 0's, a pulse will appear on wire 190. If this is not the case, a pulse will appear on wire 192. Wire 190 extends to FIG. 2L where a pulse on it will pass through OR circuit 434 to turn "ON" single shot 436. Wire 192 extends to FIG. 2J where a pulse on it will turn "ON" shot 418.

On FIG. 2G, the $ySD$-3 pulse is applied to GATE 610 in order to test the output of exclusive OR circuit 636 on FIG. 2C. If the new sign is equal to the old sign, a pulse will appear on wire 194. If this is not the case, a pulse will appear on wire 196. These wires extend to FIG. 2J where a pulse on wire 194 will turn "ON" single shot 420 and a pulse on wire 196 will turn "ON" single shot 422.

On FIG. 2K, the $ySD$-4 pulse extends through OR circuit 362 to wire 300. On FIG. 2I, the pulse on wire 300 is applied to GATE 496 in order to gate cable 286 to cable 228. Cable 286 carries the current $y$ value and cable 228 is the input cable to the $y(i$-1$)$ Register on FIG. 2F. On FIG. 2J, when single shot 420 turns "OFF" a pulse is produced which is transmitted through OR circuit 434 to turn "ON" single shot 436.

On FIG. 2B, the $ySD$-5 pulse is applied to GATE 644 in order to gate the new sign to the old $y$ sign flip-flop. On FIG. 2K, the $ySD$-5 pulse extends through OR circuit 362 to wire 300 which, as explained before, is used to gate the current $y$ value to the small $y(i$-1$)$ register. On FIG. 2G, the $ySD$-5 pulse is used to set the $ySD$ flip-flop to its 1 state.

The next sequence to be described is called the $\dot{y}$ sequence.

On FIG. 2G, the $\dot{y}$-1 pulse is applied to GATE 612 in order to test the state of the "old $y$ sign" flip-flop which is on FIG. 2B. If this flip-flop is in its 0 state, a pulse will appear on wire 200. These wires extend to FIG. 2K where a pulse on wire 198 will start pulse generator 426 and a pulse on wire 200 will start pulse generator 430.

On FIG. 2J, the $\dot{y}$-2 pulse extends through OR circuit 346 to wire 124. On FIG. 2I, the pulse on wire 124 is applied to GATE 492 in order to gate cable 286 to cable 260. Cable 286 carries the current $y$ value and cable 260 is the input cable to the Minuend Register on FIG. 2C. On FIG 2I, the $\dot{y}$-2 pulse is applied to GATE 500 in order to gate cable 218 to cable 264. Cable 218 is the output cable from the MID Register on FIG. 2D and cable 264 is the input cable to the Subtrahend Register on FIG 2C.

On FIG. 2J, the $\dot{y}$-3 pulse extends through OR circuit 348 to wire 126. On FIG. 2H the pulse on wire 126 is applied to GATE 470 in order to gate cable 288 to cable 268. Cable 288, is the output cable for the Result register of the Subtractor and cable 268 is the input cable to Compare Register No. 1 on FIG. 2C. On FIG. 2H, the $\dot{y}$-3 pulse is applied to GATE 482 in order to gate cable 232 to cable 272. Cable 232 is the output cable of the T register on FIG. 2E, and cable 272 is the input cable for Compare Register No. 2.

The ẏ-4 pulse, on FIG. 2F, is applied to GATE 586 in order to test the Compare unit on FIG. 2C. If Compare Register No. 1 is greater than Compare Register No. 2, a pulse will appear on wire 150. If this is not the case, a pulse will appear on wire 152. Wire 150 extends to FIG. 2L where a pulse on it will extend through OR circuit 434 to turn "ON" single shot 436. Wire 152 extends to FIG. 2K where a pulse on it will start the pulse generator 428.

On FIG. 2H, the ẏ-5 pulse is applied to GATE 504 in order to gate cable 218 to cable 276. Cable 218 is the output cable of the MID Register on FIG. 2D and 276 is the input cable of the Augend register of the Adder on FIG. 2B. On FIG. 2K, the ẏ-5 pulse extends through OR circuit 364 to wire 302. On FIG. 2H the pulse on wire 302 is applied to GATE 506 in order to gate cable 286 to cable 280. Cable 286 carries the current y value and cable 280 is the input cable to the Addend Register of the Adder on FIG. 2B.

On FIG. 2K, the ẏ-6 pulse extends through OR circuit 368 to wire 336. On FIG. 2B, the pulse on wire 336 is used to shift the Sum register one place to the right. It should be understood that when this shifting is done a zero is inserted at the left.

On FIG. 2H, the ẏ-7 pulse is applied to GATE 512 in order to gate cable 304 to cable 216. Cable 304 is the output cable of the Sum register on FIG. 2B and cable 216 is the input cable to the MID Register on FIG. 2D.

On FIG. 2H, the ẏ-8 pulse is applied to GATE 508 in order to gate cable 22 to cable 260. Cable 222 is the output cable of the BASE register on FIG. 2E and cable 260 is the input cable to the Minuend register on FIG. 2B. On FIG. 2H, the ẏ-8 pulse is applied to GATE 510 in order to gate cable 232 to cable 264. Cable 232 is the output cable of the T Register on FIG. 2E and cable 264 is the input cable to the Subtrahend Register on FIG. 2C.

On FIG. 2J, the ẏ-9 pulse extends through OR circuit 348 to wire 126. On FIG. 2H the pulse on wire 126 is applied to GATE 470 in order to gate cable 288 to cable 268. Cable 288 is the cable of the Result register of the Subtractor and cable 268 is the input register to Compare register No. 1. On FIG. 2J, the ẏ-9 pulse extends through OR circuit 350 to wire 128. On FIG. 2H, the pulse on wire 128 is applied to GATE 516 in order to gate cable 286 to cable 272. Cable 286 carries the current y value and cable 272 is the input cable to Compare Register No. 2.

On FIG. 2F, the ẏ-10 pulse is applied to GATE 588 in order to test the Compare unit on FIG. 2C. If Compare Register No. 1 is greater than Compare Register No. 2 a pulse will appear on wire 154. If this is not the case, a pulse will appear on wire 156. Wire 154 extends to FIG. 2L where a pulse on it will extend through OR circuit 434 to turn "ON" single shot 436. Wire 156 extends to FIG. 2K where a pulse on it will start the pulse generator 432.

On FIG. 2H, the ẏ-11 pulse is applied to GATE 518 in order to gate cable 222 to cable 276. Cable 222 is the output cable for the BASE Register on FIG. 2D and 276 is the input cable for the Augend Register on FIG. 2B. On FIG. 2K, the ẏ-11 pulse extends through OR circuit 364 to wire 302. On FIG. 2H, the pulse on wire 302 is applied to GATE 506 in order to gate cable 286 to cable 280. Cable 286 carries the current y value and cable 280 is the input cable for the Addend Register on FIG. 2C.

On FIG. 2K, the ẏ-12 pulse extends through OR circuit 368 to wire 336. Wire 336 extends to FIG. 2B where a pulse on it is used to shift the Sum register one place to the right.

On FIG. 2I, the ẏ-13 pulse is applied to GATE 486 in order to gate cable 304 to cable 220. Cable 304 is the output cable of the Sum register on FIG. 2B and cable 220 is the input cable for the BASE Register on FIG. 2D.

The next sequence to be described is the ẋ sequence.

On FIG. 2G, the ẋ-1 pulse is applied to GATE 614 to test the xSD flip-flop. If this flip-flop is equal to 1, a pulse will appear on wire 202. If it is equal to 0, a pulse will appear on wire 204. These wires extend to FIG. 2L where a pulse on wire 202 will start the pulse generator 438 and a pulse on wire 204 will turn "ON" single shot 442.

On FIG. 2I, the ẋ-2 pulse is applied to GATE 498 to gate cable 236 to cable 238. Cable 236 is the output cable of the current x Stoke Register and cable 238 is the input cable to the previous x Stroke Register. On FIG. 2H, the ẋ-2 pulse is applied to GATE 502 to gate cable 284 to cable 234. Cable 284 carries the current x value and cable 234 is the input cable to the Current x Stroke Register on FIG. 2D.

On FIG. 2H, the ẋ-3 pulse is applied to GATE 514 to gate cable 244 to cable 276. Cable 244 is the output cable of the x AVE Register on FIG. 2E and cable 276 is the input cable to the Augend Register on FIG. 2B. On FIG. 2H, the ẋ-3 pulse is applied to GATE 520 to gate cable 308 to cable 280. Cable 308 is the so called "jump" cable which will carrry either the W value or one quarter of the W value depending on the setting of the REGION flip-flop. Cable 280 is the input cable to the Addend Register on FIG. 2B.

On FIG. 2J the ẋ-4 is applied to GATE 522 to gate cable 310 to cable 268. Cable 310 carries either the current x value or the x value depending on the setting of the x flip-flop on FIG. 2D. Cable 268 is the input cable to Compare Register No. 1. On FIG. 2I, the ẋ-4 pulse is applied to GATE 524 to gate cable 304 to cable 272. Cable 304 is the output cable of the Sam Register on FIG. 2B and cable 272 is the input cable to Compare Register No. 2 on FIG. 2C.

On FIG. 2G the ẋ-5 pulse is applied to GATE 590 to test the Compare unit on FIG. 2C. If Compare Register No. 1 is greater than Compare Register No. 2, a pulse will appear on wire 158. If this is not the case, a pulse will appear on wire 160. These wires extend to FIG. 2L where a pulse on wire 158 will start the pulse generator 440 and a pulse on wire 160 will extend through OR circuit 444 to start the pulse generator 446.

On FIG. 2I, the ẋ-6 pulse is applied to GATE 526 to gate cable 246 to cable 268. Cable 246 is the output cable for Register N and 268 is the input cable for Compare Register No. 1. On FIG. 2C, the ẋ-6 pulse is used to set the Compare Register No. 2 to the binary equivalent of the decimal number 2.

The ẋ-7 pulse, on FIG. 2G, is applied to GATE 592 to test the Compare Unit on FIG. 2C. If Compare Register No. 1 is greater than Compare Register No. 2, a pulse will appear on wire 162. If this is not the case, a pulse will appear on wire 164. These wires extend to FIG. 2M where a pulse on wire 162 will start the pulse generator 450 and a pulse on wire 164 will extend through OR circuit 444 to start the pulse generator 446.

On FIG. 2G, the $\dot{x}$-8 pulse is applied to GATE 616 in order to test the ySD flip-flop on FIG. 2G. If this flip-flop is equal to 1 a pulse will appear on wire 206. If the flip-flop is equal to 0, a pulse will appear on wire 208. These wires extend to FIGS. 2L and 2M where a pulse on wire 206 will extend through OR circuit 444 to start the pulse generator 446 on FIG. 2M and a pulse on wire 208 will extend through OR circuit 454 to turn "on" single shot 456 on FIG. 2M.

On FIG. 2E, the $\dot{x}$-9 pulse is used to increment the N Register. On FIG. 2I, the $\dot{x}$-9 pulse is applied to GATE 528 to gate cable 250 to cable 276. Cable 250 is the output cable of the $x$ TOTAL Register on FIG. 2E. Cable 276 is the input cable to the Augend Register on FIG. 2B. On FIG. 2I, the $\dot{x}$-9 pulse is applied to GATE 530 in order to gate cable 310 to cable 280. Cable 310 carries either the current $x$ value of the $x^*$ value depending on the setting of the $x^*$ flip-flop on FIG. 2D. Cable 280 is the input cable to the Addend Register on FIG. 2B. On FIG. 2I, the $x$-10 is applied to GATE 532 to gate cable 304 to cable 312. Cable 304 is the output cable of the Sum register on FIG. 2B and cable 312 is the input cable for the Dividend register also on FIG. 2B. On FIG. 2I, the $\dot{x}$-10 pulse is applied to GATE 534 to gate cable 304 to cable 248. Cable 304 is the output cable of the Sum Register on FIG. 2B and cable 248 is the input cable for the $x$ TOTAL register on FIG. 2E. On FIG. 2I, the $\dot{x}$-10 pulse is applied to GATE 536 to gate cable 246 to cable 314. Cable 246 is the output cable for Register N in FIG. 2E and cable 314 is the input cable for the Divisor Register on FIG. 2B.

On FIG. 2I, the $\dot{x}$-11 pulse is applied to GATE 538 to gate cable 306 to cable 242. Cable 306 is the output cable for the Quotient Register on FIG. 2B and cable 242 is the input cable for the $x$ Ave Register on FIG. 2E.

On FIG. 2H, the $\dot{x}$-12 pulse is applied to GATE 540 to gate cable 258 to cable 268. Cable 258 is the output cable for the $x$ Left Register on FIG. 2D. Cable 268 is the input register for Compare Register 1 on FIG. 2C. On FIG. 2H, the $\dot{x}$-12 pulse is applied to GATE 542 to gate cable 310 to cable 272. Cable 310 carries either the current $x$ value or the $x$ value depending on the setting of the $x$ flip-flop. Cable 272 is the input cable for Compare Register No. 2.

On FIG. 2G, the $\dot{x}$-13 puse is applied to GATE 594 to test the output of the Compare Unit on FIG. 2C. If Compare Register No. 1 is greater than Compare Register No. 2, a pulse will appear on wire 166. If this is not the case, a pulse will appear on wire 168. These wires extend to FIGS. 2L and 2M where a pulse on wire 166 will turn "ON" single shot 448 and a pulse on wire 168 will extend through OR circuit 458 to turn "ON" single shot 460 on FIG. 2L.

On FIG. 2H, the $\dot{x}$-14 pulse is applied to GATE 544 to gate cable 310 to cable 256. Cable 310 carries either the current $x$ value of the $x^*$ value depending on the setting of the $x^*$ flip-flop. Cable 256 is the input cable to the $x$ Left Register on FIG. 2D.

On FIG. 2H, the $\dot{x}$-15 pulse is applied to GATE 546 to gate cable 316 to cable 276. Cable 316 carries one-half of the previous $x$ stroke value and cable 276 is the input cable to the Augend Register on FIG. 2B. On FIG. 2H, the $\dot{x}$-15 pulse is applied to GATE 548 to gate cable 318 to cable 280. Cable 318 carries one quarter of the previous $x$ stroke value and cable 280 is the input cable to the Addend Register on FIG. 2B.

On FIG. 2B, the $x$-16 pulse is used to gate the Sum Register to the Sum-Hold Register.

On FIG. 2B the $\dot{x}$-17 pulse is used to gate the Sum-Hold Register to the Augend Register.

On FIG. 2H, the $\dot{x}$-18 pulse is applied to GATE 550 to gate cable 320 to cable 280. Cable 320 carries one quarter of the current $x$ stroke value and cable 280 is the input cable to the Addend Register.

On FIG. 2H, the $\dot{x}$-19 pulse is applied to GATE 552 to gate cable 304 to cable 252. Cable 304 is the output cable of the Sum Register on FIG. 2B and cable 252 is the input cable to the $x$ Seg Register on FIG. 2D.

On FIG. 2H, the $\dot{x}$-20 pulse is applied to GATE 554 to gate cable 212 to cable 276. Cable 212 carries the W value from the W Register on FIG. 2E and cable 276 is the input cable to the Augend Register on FIG. 2B. On FIG. 2H, the $\dot{x}$-20 pulse is applied to GATE 556 to gate cable 214 to cable 280. Cable 214 carries one-half of the W value from the W Register and cable 280 is the input cable to the Addend Register on FIG. 2B.

On FIG. 2H, the $\dot{x}$-21 pulse is applied to GATE 558 to gate cable 304 to cable 264. Cable 304 is the output cable of the Sum Register on FIG. 2B and cable 264 is the input cable to the Subtrahend Register on FIG. 2C. On FIG. 2I, the $\dot{x}$-21 pulse is applied to GATE 560 to gate cable 310 to cable 260. Cable 310 carries either the current $x$ value or the $x$ value depending on the setting of the $x$ flip-flop on FIG. 2D. Cable 260 is the input cable to the Minuend Register on FIG. 2C.

On FIG. 2I, the $\dot{x}$-22 pulse is applied to GATE 562 to gate cable 254 to cable 268. Cable 254 is the output cable of the x Sec Register on FIG. 2D. Cable 268 is the input cable to Compare Register No. 1 on FIG. 2C. On FIG. 2K, the $\dot{x}$-22 pulse extends through OR circuit 370 to wire 324. On FIG. 2I, the pulse on wire 324 is applied to GATE 564 to gate cable 288 to cable 272. Cable 288 is the output cable of the Result Register of the Subtractor on FIG. 2C and cable 272 is the input cable to Compare Register No. 2.

On FIG. 2G, the $\dot{x}$-23 pulse is applied to GATE 596 to test the output of the Compare Unit on FIG. 2C. If Compare Register No. 1 is greater than Compare Register No. 2, a pulse will appear on wire 170. If this is not the case, a pulse will appear on wire 172. These wires extend to FIG. 2L where a pulse on wire 170 will extend through OR circuit 454 to turn "ON" single shot 456. A pulse on wire 172 will turn "ON" single sot 452.

On FIG. 2I, the $\dot{x}$-24 pulse is applied to GATE 566 to gate cable 288 to cable 252. Cable 288 is the output cable of the Result Register of the Subtractor on FIG. 2C and cable 252 is the input cable for the $x$ Seg Register on FIG. 2D.

On FIG. 2I, the $\dot{x}$-25 pulse is applied to GATE 570 to gate cable 236 to cable 242. Cable 236 carries the current $x$ stroke value from the $x$ Stroke Register on FIG. 2D and cable 242 is the input cable to the $x$ Ave Register on FIG. 2E.

On FIG. 2J, the $\dot{x}$-25 pulse extends through OR circuit 342 to wire 118. Wire 118 extends to FIG. 2E where a pulse on it will reset the $x$ Ave Register to 00—00 and reset the N Register to 00—00. The REGION F.F. is also reset to 0. On FIG. 2I, the $\dot{x}$-25 pulse is applied to GATE 568 to gate cable 254 to cable 256. Cable 254 is the output cable of the $x$ Seg Register and cable 256 is the input cable of the $x$ Left Register. Also, on FIG. 2I, the $\dot{x}$-25 pulse is applied to GATE 662 in order to gate cable 254 to cable 664. Cable 254 is the output cable of the $x$ Seg Register and cable 664 extends to the character recognition circuits. The $\dot{x}$-25 pulse is also furnished to the character recognition circuits as a segmentation signal. On FIG. 2K, the $\dot{x}$-25 pulse extends through OR circuit 358 to wire 136. Wire 136 extends to FIG. 2G where a pulse on it will reset the xSD flip-flop and the ySD flip-flop to their 0 states.

The $\dot{x}$-25 pulse extends through OR circuit 358 on FIG. 2K to wire 136. The pulse on wire 136 extends to FIG. 2G where it resets the xSD and ySD flip-flops.

On FIG. 2I, the $\dot{x}$-27 pulse is applied to GATE 572 to gate cable 284 to cable 252. Cable 284 carries the current x value and cable 252 is the input cable to the x SEG Register on FIG. 2D.

CONCLUSIONS

The presently disclosed segmentation technique is predicated on the novel and unobvious discovery that changes in the stylus velocity can be correlated with distance travelled to give a segmentation method that works on input that is not uniformly proportioned, aligned and slanted. Further, by incorporating a unique analysis of the characters as they are formed, ascenders and descenders are specially weighted to avoid erroneous results which might otherwise occur.

The system utilized herein operates sequentially in real time to allow a person inputting data into some sort of a computer or computer-like system via such a character recognition device to have an almost instantaneous display of the system's interpretation of his input. This saves the user time in case, for example, a mistake is made and also requires considerably less storage and processing hardware than prior techniques such as suggested by the previously referenced Harmon patent.

While a preferred embodiment of the invention has been set forth and described it will be apparent that within such large systems major changes in the basic operating controls could be made without departing from the underlying concepts of the invention. Also certain sequences of measurements and observations within the segmentation mechanism might also be made by those skilled in the art utilizing the herein disclosed basic concept.

We claim:

1. A character segmentation mechanism for cursive handwriting which comprises:
   means for obtaining continuous X and Y coordinate data and the instantaneous X and Y velocities associatted therewith as a writing stylus is moving,
   means for detecting when a Y extremal is encountered (Y velocity = 0),
   means for detecting when an X extremal (X velocity = 0) is encountered,
   means for successively averaging the X displacement values associated with a particular segment whenever either extremal is encountered, whereby the average is updated each time,
   means for comparing the X displacement value associated with each X extremal to see if its magnitude is more than a predetermined threshold value above the current average X displacement value, and
   means for specifying that a segmentation should occur when the said displacement value is greater than said predetermined amount.

2. A character segmentation mechanism as set forth in claim 1 including means for computing a segmentation point which comprises:
   giving a first predetermined weighting to the X displacement of the previously encountered X extremal value and a second predetermined weighting to the X displacement for the extremal value when a segmentation decision was made, and
   adding said weight displacement values to obtain the X displacement of the segmentation.

3. A character segmentation mechanism as set forth in claim 1 including means for continuously examining the Y displacements of all sampled displacement values for a given cursive handwriting sample, and determining if the Y displacement is either less than or greater than a predetermined vertical zone value,
   means for storing the X displacement value associated with said Y displacement value, when said determination is affirmative,
   means for using said X displacement value so stored for X displacement averaging operations for all extremals whose Y displacement values are greater or less than said predetermined zone values.

4. A character segmentation mechanism as set forth in claim 3 including means for continuously updating said predetermined vertical Zone values wherein said pre-determined zone values represent the Y displacements for the top and bottom, respectively, of lower case script characters not having ascenders or descenders, which step includes averaging the respective Y displacement, for any Y extremal found to be within a predetermined distance from said previously predetermined displacements, with said previous predetermined zone value.

5. A character segmentation mechanism as set forth in claim 4 including means for adding a predetermined threshold value to said predetermined Y displacement values prior to making said greater than/less than comparison.

6. A character segmentation method as set forth in claim 1 including means for successively evaluating the Y displacement values of all sampled X-Y displacement values for the corresponding sampling points for a given cursive handwriting sample, and determining if the Y displacement is either less than or greater than a predetermined vertical zone value having an upper and a lower boundary value,
   storing the X displacement value associated with said Y displacement value, when said determination is affirmative,
   using said X displacement value so stored for X displacement averaging operations for all X and Y extremals whose Y displacement values are greater or less than said predetermined zone values.

7. A character segmentation method as set forth in claim 6 including the step of continuously updating said predetermined vertical zone values wherein said predetermined zone values represent the Y displacements for the top and bottom, respectively, of lower case script characters not having ascenders or descenders, said step further including averaging the respective Y displacement, for any Y extremal found to be within a predetermined distance from said previously predetermined displacements with said previous predetermined zone value.

8. A character segmentation method as set forth in claim 7 including the steps of combining a predetermined threshold value with said predetermined Y displacement values prior to making said greater than/less than comparison.

9. A character segmentation mechanism for cursive handwriting including:
- a writing stylus, tablet and data generation means for providing continuous samples of X and Y displacements of said moving stylus and X and Y velocity data associated with each displacement point,
- means for detecting the X extremals ($\dot{x}=0$) and the Y extremals ($\dot{y}=0$),
- means utilizing the X coordinates of both the X and Y extremals for determining an average character midpoint on the X axis, and,
- means for examining the X coordinate of each X extremal for determining if such extremal lies within a predetermined X boundary for a given character based on said average character midpoint determination.

10. A character segmentation mechanism as set forth in claim 9 wherein the means for determining said average character midpoint comprises means for successively averaging the X displacement value for every extremal encountered with an initial X displacement value whereby as more extremal points for a given character are encountered, the average midpoint becomes more truly representative of the mid location of the character.

11. A character segmentation mechanism as set forth in claim 10 including means for comparing the X displacement value associated with each X extremal encountered with the current character average midpoint value to determine if it is within a predetermined distance thereof, and means for indicating to the system that a segmentation should occur when such condition is encountered.

12. A character segmentation mechanism as set forth in claim 11 including means for determining where the segmentation is to occur between two characters after a decision to segment has been made, said determining means including means for weighting and adding the X displacement of the last encountered X extremal to a weighted value for the X displacement of the currently encountered X extremal which it has been found lies outside of a predetermined character width boundary.

13. A character segmentation mechanism as set forth in claim 12 including means for determining that a predetermined number of extremals has been encountered before a decision to segment can be made.

14. A character segmentation mechanism as set forth in claim 13 including means for considering the X displacements of those extremals belonging to ascender or descender strokes to be the values where they cross the midzone and base line, respectively, for the handwriting sample being analyzed.

15. A character segmentation mechanism as set forth in claim 14 including means for examining the Y displacement value associated with each Y extremal and means for determining if said Y displacement value is within a threshold range of an average midzone value or within a threshold range of an average base line value, and
- means responsive to such a determination for modifying the average midzone or base line values, respectively, in accordance with the Y displacement of the just encountered Y extremal.

16. A segmentation mechanism as set forth in claim 15 including means for specifying that the initial average X displacement value specifying an estimated midpoint for each character is either the beginning X displacement where the character is the first character in the string of connected characters, or the X displacement of the segmentation point where it is not the first character in such a string.

17. A method for effecting character segmentation in a cursive script handwriting analysis system which comprises:
- obtaining continuous X and Y coordinates and the instantaneous X and Y velocities related thereto as a writing stylus is moving,
- detecting when a Y extremal is encountered (Y velocity = 0),
- detecting when a X extremal (X velocity = 0) is encountered,
- successively averaging the X displacement values associated with a particular segment whenever either extremal is encountered, whereby said X displacement value is successively updated,
- comparing the X displacement value associated with each X extremal to see if it is more than a predetermined magnitude greater than the current average X displacement value for the segment being evaluated, and
- deciding that a segmentation should occur when the said displacement magnitude is greater than said predetermined amount.

18. A character segmentation method as set forth in claim 17 including the steps of computing a segmentation point which comprises giving a first predetermined weighting to the X displacement of the previously encountered extremal value and a second predetermined weighting to the X displacement for the external value when a segmentation decision was made, and adding said weighted displacement values to obtain the X displacement of the segmentation.

* * * * *